(12) United States Patent
Masuda et al.

(10) Patent No.: US 6,469,826 B1
(45) Date of Patent: Oct. 22, 2002

(54) OPTICAL AMPLIFIER

(75) Inventors: Hiroji Masuda, Kanagawa-ken (JP); Junichi Kani, Yokohama (JP); Noboru Takachio, Kanagawa-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/612,913

(22) Filed: Jul. 10, 2000

(30) Foreign Application Priority Data

Jul. 12, 1999 (JP) .......................................... 11-197126

(51) Int. Cl.⁷ ............................. H04B 10/12; H01S 3/00
(52) U.S. Cl. ...................................... 359/349; 359/337.2
(58) Field of Search ................................. 359/341, 349, 359/337.2, 337.3, 337.21, 341.1

(56) References Cited

U.S. PATENT DOCUMENTS

| | | | | |
|---|---|---|---|---|
| 6,049,417 A | * | 4/2000 | Srivastava | 359/341 |
| 6,049,418 A | * | 4/2000 | Srivastava et al. | 359/337.4 |
| 6,104,527 A | * | 8/2000 | Yang | 359/341.33 |
| 6,204,958 B1 | * | 5/2001 | Taylor | 359/337 |
| 6,236,482 B1 | * | 5/2001 | Toyohara | 359/124 |
| 6,304,370 B1 | * | 10/2001 | Barnard | 359/341.1 |
| 6,307,668 B1 | * | 10/2001 | Bastien et al. | 359/337.1 |
| 6,317,254 B1 | * | 11/2001 | Park et al. | 359/341.33 |

FOREIGN PATENT DOCUMENTS

| | | |
|---|---|---|
| EP | 0 841 764 A2 | 5/1998 |
| EP | 0 883 218 A1 | 12/1998 |
| EP | 2 764 452 A1 | 12/1998 |
| JP | 4-101124 | 4/1992 |
| JP | 10-229238 | 8/1998 |
| JP | 10-341206 | * 12/1998 |
| JP | 11-204859 | 7/1999 |
| WO | WO 99/17410 | 4/1999 |

OTHER PUBLICATIONS

Cordina, K.J. et al. "Ultra low noise long wavelength EDFA with 3.6 dB external noise figure." OFC/IOOC '99, Feb. 1999, pp. 13–15.*

Wysocki, P.F. et al. "Broad–Band Erbium–Doped Fiber Amplifier Flattened Beyond 40 nm Using Long–Period Grating Filter." IEEE Photonics Tech. Lett. 9:10, Oct. 1997, pp. 1343–1345.*

Chung, H. S. "Demonstration of 52–nm Gain Bandwidth over 2400 km (540 dB Loss) with Gain–Equalized Low–Noise Wide–Ban EDFA's." IEEE Photonics Tech. Lett. 12:3, Mar. 2000, pp. 329–331.*

(List continued on next page.)

*Primary Examiner*—Thomas H. Tarcza
*Assistant Examiner*—Andrew R. Sommer
(74) *Attorney, Agent, or Firm*—Burns, Doane, Swecker & Mathis, L.L.P.

(57) ABSTRACT

In the optical amplifier an optical divider based on long wavelength (or short wavelength) transmission type dielectric multi-layer filter divides input signal light according to wavelengths, and amplifying sections disposed in parallel and having different respective wavelength amplification regions respectively amplify light signals emitted from the optical divider, and an optical combiner based on long wavelength (or short wavelength) transmission type dielectric multi-layer filter combines light signals output from the respective amplifying sections. In another configuration of the optical amplifier, input signal light is divided using an optical divider based on a dielectric multi-layer filter of a long wavelength (or short wavelength) transmission type, and output signals from the divider are filtered using an optical filter connected in series to a short wavelength (or long wavelength) amplifier generating a loss in the long wavelength (or short wavelength) region of the light signals. Interference noise caused by residual reflection components in the dielectric multi-layer filter is thus suppressed, thereby increasing the bandwidth of useable wavelengths in the signal light.

4 Claims, 24 Drawing Sheets

OTHER PUBLICATIONS

Lee, J.H. and Park, N. "Split–stage equalisation filter approach for noise figure reduction in miltichannel gain–flattened EDFA." CLEO '98, May 1998, pp. 289–290.*

Xie, Y. et al. "Spectrally efficient L–C band EDFA having continuous inter–band channel region using sampled FBGs." CLEO 2000, May 2000, pp. 284–285.*

Jolley, N. "Broadband Erbium Doped Fibre Amplifiers for WDM Applications." IEE Colloquium on New Developments in Optical Amplfiers, 1998. pp. 7/1–7/5.*

Yamada, et al., "Broadland and gain–flattened amplifier composed of a 1.55 μm–band and a 1.58 μm–band $Er^{3+}$–doped fibre amplifier in a parallel configuration", Electronic Letters, vol. 33, No. 8, pp. 710–711 (Apr. 1997).

Sun, et al., "A Gain–Flattened Ultra Wide Band EDFA For High Capacity WDM Optical Communications Systems", ECOC '98, pp. 53–54 (Sep. 1998).

Masuda, et al., "Wideband erbium–doped fibre amplifiers with three–stage amplification", Electronic Letters, vol. 34, No. 6, pp. 567–568 (Mar. 19, 1998).

Matsuda, et al., "Wideband, gain–flattened, erbium–doped fibre amplifiers with 3 dB bandwidths of >50nm", Electronic Letters, vol. 33, No. 12, pp. 1070–1071 (Jun. 5, 1997).

Sun, et al., "An 80 nm Ultra Wide Band EDFA with Low Noise Figure and High Output Power", ECOC 97, Conference Publication No. 448, pp. 69–72 (Sep. 22–25, 1997).

EP 00 40 1982, European Search Report.

* cited by examiner

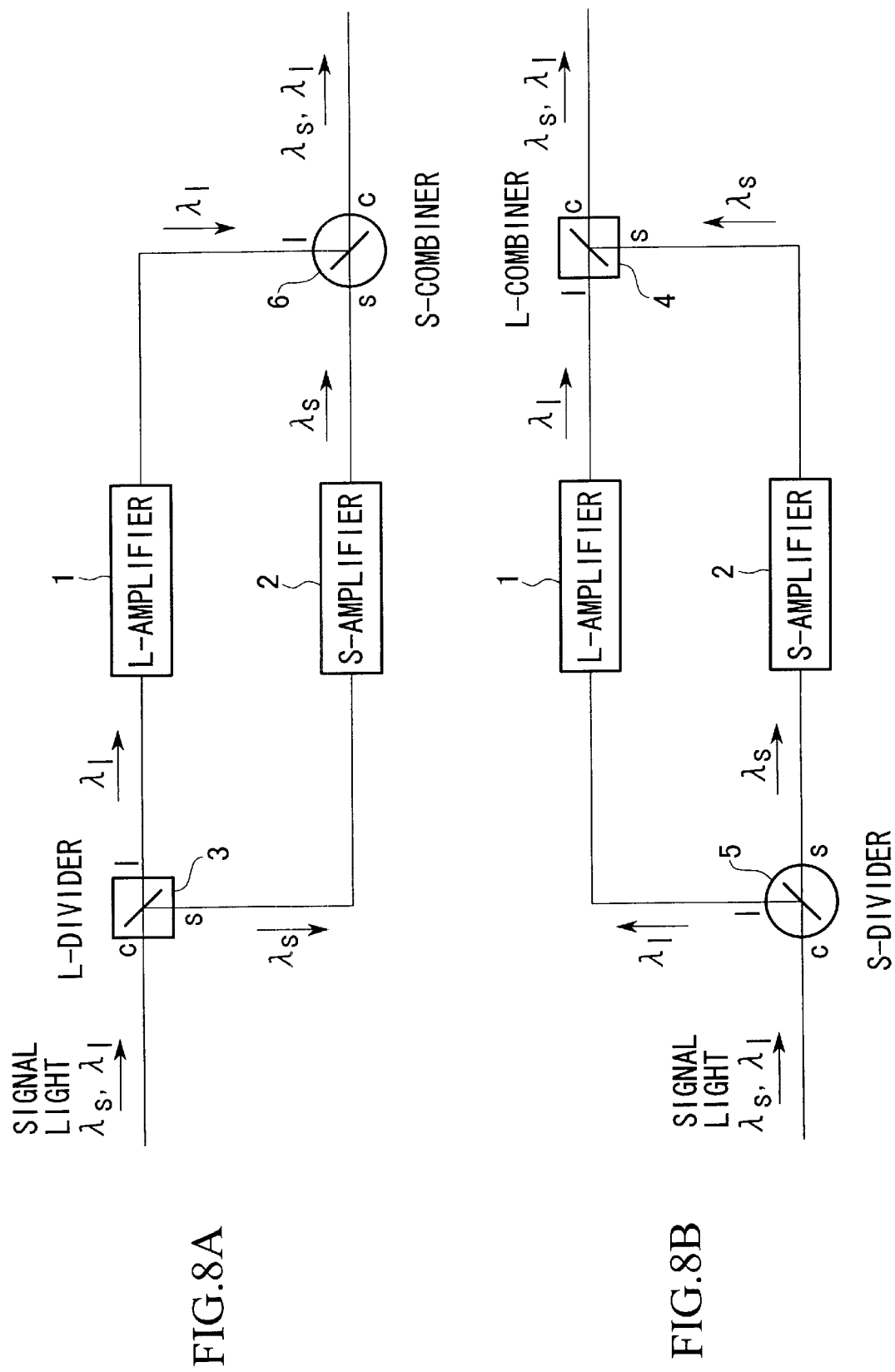

OPTICAL AMPLIFIER

BACKGROUND OF THE INVENTION

1. Field of the Invention

The present invention relates to an optical amplifier for use in optical fiber communication systems and optical signal processing systems.

This application is based on patent application No. Hei 11-197126, the content of which is incorporated herein by reference.

2. Description of the Related Art

The basic configuration of a conventional optical amplifier is shown in FIG. 22. This optical amplifier is comprised by two amplifying sections having different gain band regions (L-amplifying section and S-amplifying section), a divider, and a combiner, and attempts to broaden the operational bandwidths by coupling the two gain band regions in the wavelength domain. (refer to "Broadband and gain-flattened amplifier composed of a 1.55 $\mu$m-band and a 1.58 $\mu$m-band $Er^{3+}$-doped fiber amplifier in a parallel configuration", M. Yamada et. al., IEE Electronics Letters, Vol. 33, No. 8, 1977, pp710–711) (Reference 1).

Various types of dividers and combiners are utilized in constructing such optical amplifiers, and they can be classified as a dielectric multi-layer filter or a combination of fiber grating in association with circulator. Those based on dielectric multi-layer filter are reported in the following references.

"Broadband and gain-flattened amplifier composed of a 1.55 $\mu$m-band and a 1.58 $\mu$m-band $Er^{3+}$-doped fiber amplifier in a parallel configuration", M. Yamada et. al., IEE Electronics Letters, vol. 33, no. 8, 1977, pp710–711. (Reference 1)

Japanese Unexamined Patent Application, First Publication, No. Hei 10-229238, Publication Date, Aug. 25, 1998. (Reference 2)

Japanese Unexamined Patent Application, First Publication, No. Hei 11-204859, Publication Date, Jul. 30, 1999. (Reference 3)

International Application Published under the Patent Cooperation Treaty, PCT/US98/16558, "Optical amplifier apparatus", International publication date, Apr. 8, 1999, International Publication Number WO 99/17410. (Reference 4)

Those based on a combination of circulator and fiber grating are reported in the following references.

European Patent Application, EP 0 883 218 A1, "Wide band optical amplifier", Publication date Sep. 12, 1998. (Reference 5)

"A gain-flattened ultra wide band EDFA for high capacity WDM optical communication systems", Y.Sun et. al., Technical Digest of ECOC'98, pp.53–54, 1998. (Reference 6)

The following reference does not specify what type of device is used.

Japanese Unexamined Patent Application, First Publication, No. Hei 4-101124, Publication Date, Apr. 2, 1992. (Reference 7)

All of the above references assume that the wavelength division properties are either perfect or present no particular problems.

However, as will be shown with specific examples in the following, wavelength division properties of these devices are not perfect, and problems are encountered depending on the manner and conditions of applying the amplifiers.

First, the most common problem of such amplifiers is encountered when the dividers and combiners are made of dielectric multi-layer filters. FIGS. 1A and 1B show the configuration of a conventional optical amplifier, where FIG. 1A shows a design based on dielectric multi-layer filters of the long wavelength transmission type (L-type) for the divider and combiner, represented by L-divider (3) and L-combiner (4), and FIG. 1B shows a design based on dielectric multi-layer filters of the short wavelength transmission type (S-type) for the divider and combiner, represented by S-divider (5) and S-combiner (6).

The amplifying section has a gain medium and a pumping section for excitation, and examples of such optical amplifiers are rare-earth doped fiber amplifier, fiber Raman amplifier and semiconductor laser amplifier. The rare-earth doped fiber amplifiers include erbium-doped fiber amplifier and the like, and according to "Wideband erbium-doped fibre amplifiers with three-stage amplification", H. Masuda et. al., IEE Electronics Letters, vol. 34, no. 6, 1998, pp567–568 (Reference 8), it is advantageous when such an amplifier has a gain equalizer to broaden the region of flat gain because such an amplifier can produce a large total gain bandwidth.

In optical communication systems, optical amplifiers are generally designed to receive wavelength-multiplexed light signals, and in optical signal processing systems for instruments and the like, optical amplifiers are generally designed to receive wavelength- multiplexed light signals or single wavelength light signals.

FIGS. 2A and 2B show configurations of the divider, where FIG. 2A represents an L-type dielectric multi-layer filter (L-divider), and FIG. 2B represents an S-type dielectric multi-layer filter (S-divider). The L-divider receives input light containing a short-wavelength $\lambda s$ and a long wavelength $\lambda l$ in the common port (c), and transmits a long wavelength $\lambda l$ from the transmission port (l) and reflects a short wavelength $\lambda s$ from the reflection port (s). On the other hand, the S-divider receives input light containing a short-wavelength $\lambda s$ and a long wavelength $\lambda l$ in the common port (c), and reflects a long wavelength light $\lambda l$ from the reflection port (l) and transmits a short wavelength light $\lambda s$ from the transmission port (s).

FIGS. 3A and 3B show configurations of the combiner, where FIG. 3A represents an L-type dielectric multi-layer filter (L-combiner), and FIG. 3B represents an S-type dielectric multi-layer filter (S-combiner). The L-combiner receives input light containing a short-wavelength $\lambda s$ from the reflection port (s) and a long wavelength $\lambda l$ from the transmission port (l), and outputs light containing a long wavelength $\lambda l$ and a short wavelength $\lambda s$ from the common port (c). On the other hand, the S-combiner receives input light containing a short-wavelength $\lambda s$ from the transmission port (s) and a long wavelength $\lambda l$ from the reflection port (l), and outputs light containing a long wavelength $\lambda l$ and a short wavelength $\lambda s$ from the common port (c).

Referring to FIGS. 1A and 1B, the dividers (L- and S-dividers) 3 and 5, perform the steps described above, and divide the multiplexed signal light containing a long wavelength $\lambda l$ and a short wavelength $\lambda s$ into a long wavelength signal light $\lambda l$ and a short wavelength signal light $\lambda s$, which are input into the respective amplifying sections (L- and S-amplifying sections) 1 and 2, and are combined in the combiners 4 and 6 and multiplexed light signals are thus output.

However, there are problems in the performance of the light amplifiers described above, which will be explained in the following.

FIGS. 4A and 4B show gain spectra obtained in the amplifying sections (L- and S-amplifying sections) 1 and 2, where FIG. 4A shows an overall view of the gain region while FIG. 4B shows details of gains in the vicinities of the wave boundaries (wavelengths λtr-s to λtr-l) of the L- and S-amplifying sections. In FIG. 4B, wavelengths in the L-amplifying section are denoted by 1 1* and those in the S-amplifying section are denoted by λs*, and the peak gains in the L-, S-amplifying sections are denoted by G while the wavelength-specific gains for λl*, λs* are denoted by G*.

FIGS. 5A and 5B show loss spectra in the L-divider, and show the losses relating to a transmission loss between ports c and s, and the same between ports c and l (refer to FIGS. 2A and 2B), which are denoted respectively by Lcs1 and Lc/1 where 1 indicates that the losses are related to long wavelengths. FIG. 5A shows the loss in the overall view of the gain region and FIG. 5B shows the details of the loss in the wave boundary. For both Lcs1 and Lc/1, the loss becomes larger as the wavelength of the signal waves moves away from the respective boundary wavelengths (wavelengths λtr-s to λtr-1) into fringes of the respective gain regions.

However, in the long wavelength side of the loss spectrum (i.e., at the λtr-l end), the loss Lcs1 between the port s (for reflected light) and the common port c is limited to a certain constant value, because of the contribution from residual reflection components in the dielectric multi-layer filter.

The difference in the wavelengths λtr-s to λtr-l (referred to as the boundary bandwidth) is typically 5~10 nm at a 1.5 μm wavelength, and the limiting value and the loss at the wavelength λs* are typically about 10 dB and 20 dB, respectively. The boundary bandwidth and the slope of the curve of loss spectrum in the vicinity of the wave boundary are dependent on the parameters (composition and the number of layers of lamination) of the dielectric multi-layer filter.

FIGS. 6A and 6B show the loss spectra of the S-type divider, where FIG. 6A, 6B relate, respectively, to the transmission losses between ports s and 1, and between ports c and l shown in FIGS. 2A and 2B (referred to as Lcs2, Lc/2, where 2 indicates that the losses are related to short wavelengths). FIG. 6A refers to the overall view of the loss region and FIG. 6B shows details of losses in the wave boundary. Both Lcs2, Lcl2 show a tendency to increase as the wavelengths of the signal waves move away from the respective boundary wavelengths (wavelengths λtr-s to λtr-l) into fringes of the gain regions.

However, in the short wavelength side of the loss spectrum (i.e., at the λtr-s end), the loss Lcs2 between the port l (for reflected light) and the common port c is limited to a certain constant value, which is caused by the contribution from residual reflection components in the dielectric multi-layer filter.

The difference in the wavelengths λtr-s to λtr-l (referred to as the boundary bandwidth) is typically 5~10 nm at a 1.5 μm wavelength, and the limiting value and the loss at the wavelength λs* are typically about 10 dB and 20 dB, respectively. The boundary bandwidth and the slope of the curve of loss spectrum in the vicinity of the wave boundary are dependent on the parameters (composition and the number of layers of lamination) of the dielectric multi-layer filter.

The loss spectra of the L- and S-type combiners are the same as the loss spectra of the L- and S-type dividers shown in FIGS. 5 and 6, because of the reciprocality of light propagation. That is, if the transmission ports are the same, the loss values are the same.

FIGS. 7A and 7B show loss spectra in the optical circuits of a conventional optical amplifier. The losses are incurred in the L- and S-amplifying sections, and the circuit loss is represented by a sum of the losses in the dividers and combiners, and are expressed in the units of dB. FIG. 7A shows the losses in the L-type divider and combiner shown in FIG. 1A, and FIG. 7B shows the losses in the S-type divider and combiner shown in FIG. 1B.

In the case of the L-type amplifier, the loss value (denoted by Li) in the S-amplifying section at a wavelength λl* is limited to 20 dB, which is twice the limit value (about 10 dB). These values, 20 dB and 10 dB, correspond to non-dimensional numbers, 100 and 10, respectively, so that the former is ten times the latter. On the other hand, the case of the S-type amplifier, the loss value (denoted by Ls) in the L-amplifying section at a wavelength λs* is limited to 20 dB, which is twice the limit value (about 10 dB). In other words, the loss of signal light at the wavelength λs* is limited to ten times the limit value.

As explained above, in the vicinity of the wave boundaries, because the wave separation properties in the dividers and combiners are not perfect, the output light, for example wavelength λl*, from its primary circuit (through the L-amplifying section) is affected by the contribution from the residual light in the reflection circuit (through the S-amplifying section).

For the purpose of providing a quantitative explanation, the optical powers of the primary output light and the residual light are designated, respectively, by P and P*. If the value of P* is not sufficiently small compared with P, coherent interference is generated and interference noise will be superimposed on the signal light to cause operational problems. For example, in an optical communication system, an increase in bit error rate will lead to degradation of the system performance.

In the L-type divider and combiner (refer to FIG. 1A), P and P* are related to the input power Pin (in units of dBm) according to the following expressions.

$$P=Pin+G \text{ and } P^*=Pin+G^*-Ll \quad (1)$$

$$P-P^*=G-G^*-+Ll \quad (2)$$

where G* is the gain in the residual circuit and Ll represents the circuit loss described in FIGS. 7A and 7B, and wavelength-dependent losses in the dividers and combiners are neglected for simplicity. If it is assumed that the difference between G and G* is smaller than Ll and can be neglected, the difference between P and P* is equal to Ll from equation (2). In the example given in FIGS. 7A and 7B, Ll is about 20 dB, but this value is not sufficiently large, so that interference noise is generated.

Similarly, in the configuration based on S-type dividers and combiners (refer to FIG. 1B), P and P* are related to the input power Pin (in units of dBm) according to the following expressions.

$$P=Pin+G \text{ and } P^*=Pin+G^*-Ls \quad (3)$$

$$P-P^*=G-G^*+Ls \quad (4)$$

where Ls represents the circuit loss described in FIGS. 7A and 7B. If it is assumed, for simplicity, that the difference between G and G* is smaller than Ls and can be neglected, the difference between P and P* is equal to Ls from equation (4). In the example given in FIGS. 7A and 7B, Ls is about 20 dB, but this value is not sufficiently large, so that interference noise is generated.

If it is assumed that 30 dB is a sufficiently high value of the difference P−P* to prevent the interference noise from being generated, in the wavelength regions where the gain difference, G–G*, is less than 10 dB, it is obvious that interference noise cannot be neglected.

In the amplifier based on L-type dividers and combiners, the signal wavelength in the long wavelength region to produce a gain difference G–G* of less than 10 dB is designated by $\lambda l^{}$ as indicated in FIGS. 4A and 4B, and the gain value at this wavelength is designated by G. Then, as shown in FIG. 7A, in the region from the vicinity of the signal wavelength $\lambda s^{**}$ (where the power difference P–P* in the short wavelength region becomes less than 30 dB) to the vicinity the signal wavelength $\lambda l^{**}$, the optical power difference P–P* is less than 30 dB. Therefore, because of such double adverse effects, i.e., insufficient differences in gain as well as output power levels caused by residual reflection components in both L- and S-devices, interference noise generated in the boundary bandwidth causes degradation in the amplifier performance. Similar results occur in the amplifier based on S-type dividers and combiners, and therefore, it creates a difficulty that the useable wavelengths are restricted in the conventional design of amplifiers regardless of the wavelengths of dividers and combiners.

As discussed above, in the conventional technologies based on dielectric multi-layer filters, interference noises are unavoidable in the signal waves in the vicinity of the wave boundaries, and therefore, it creates a problem that the useable wavelengths are restricted. Even in those systems using dividers and combiners not based on dielectric multi-layer filters, the same problems are experienced because the wavelength division properties of the dividers and combiners are not perfect.

SUMMARY OF THE INVENTION

It is an object of the present invention to resolve the problems outlined above, and provide an optical amplifier having a broad bandwidth of useable wavelength for processing input signal light.

According to the present invention, the object has been achieved in an optical amplifier comprising: an optical divider for dividing input signal light according to wavelength; two amplifying sections disposed in parallel and having different wavelength amplification regions for amplifying respective light signals emitted from the optical divider; an optical combiner for combining the light signals output from the respective amplifying sections; and an optical filter disposed in series with one of the two amplifying sections for generating a loss for eliminating mixed wave components in a wavelength region corresponding to the wavelength region of the light signal passing through the other amplifying section.

The optical amplifier of such a design enables to narrow the latent noise region by the action of the filter in generating a loss in residual reflection components created by the wave division effect in the optical divider so as to increase the gain performance of the signal processing circuit associated with the optical filter.

Also, the object has also been achieved in another design of the optical amplifier comprising: an optical divider having a dielectric multi-layer filter for dividing input signal light according to wavelength; two amplifying sections disposed in parallel and having different wavelength amplification regions for amplifying respective light signals emitted from the optical divider; and an optical combiner for combining light signals output from respective amplifying sections using a filter having a blocking wavelength region different than that of the dielectric multi-layer filter provided in the optical divider.

The optical amplifier of such a design enables narrowing of the latent noise region as a result of improved gain in the signal processing circuits because the transmission region of the dielectric multi-layer filter used in the optical divider is different than that of the dielectric multi-layer filter used in the optical combiner.

Accordingly, the present optical amplifier provides benefits that the wavelength bandwidth of the latent noise region has been narrowed and, consequently, the bandwidth of useable wavelengths of signal light that can be used for optical processing purposes has been broadened.

BRIEF DESCRIPTION OF THE DRAWINGS

FIGS. 8A, 8B are schematic diagrams of the first configuration of the optical amplifier of the present invention.

DESCRIPTION OF THE PREFERRED EMBODIMENTS

The following embodiments do not restrict the interpretation of the claims relating to the present invention, and the combination of all the features explained in the embodiments are not always indispensable means of solving the problem.

Figure 1A:
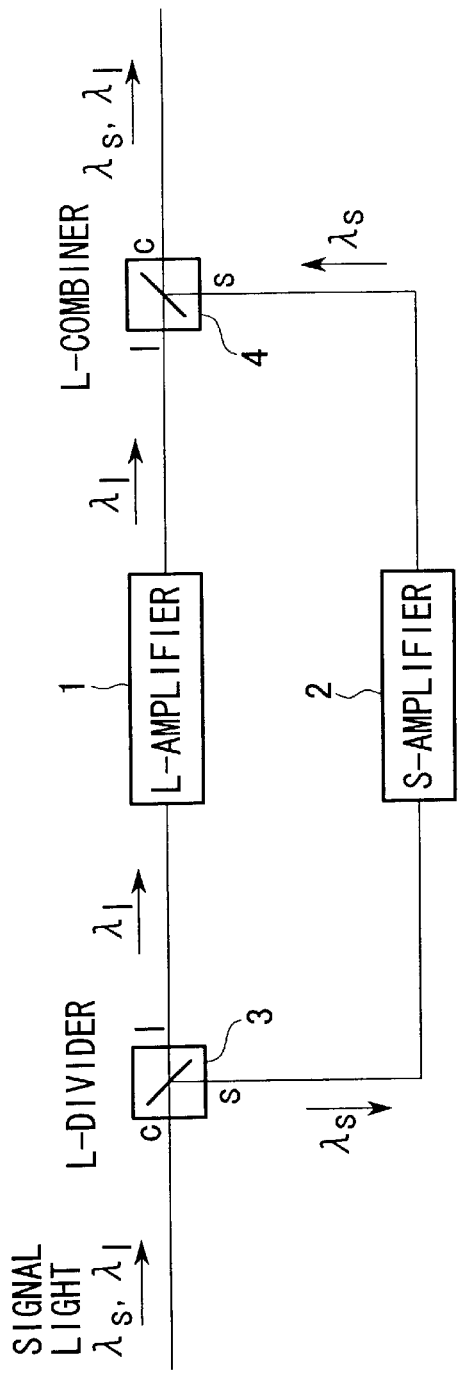
FIGS. 1A, 1B are schematic diagrams of the configurations of an optical amplifier according to the conventional technology.
Figure 1B:
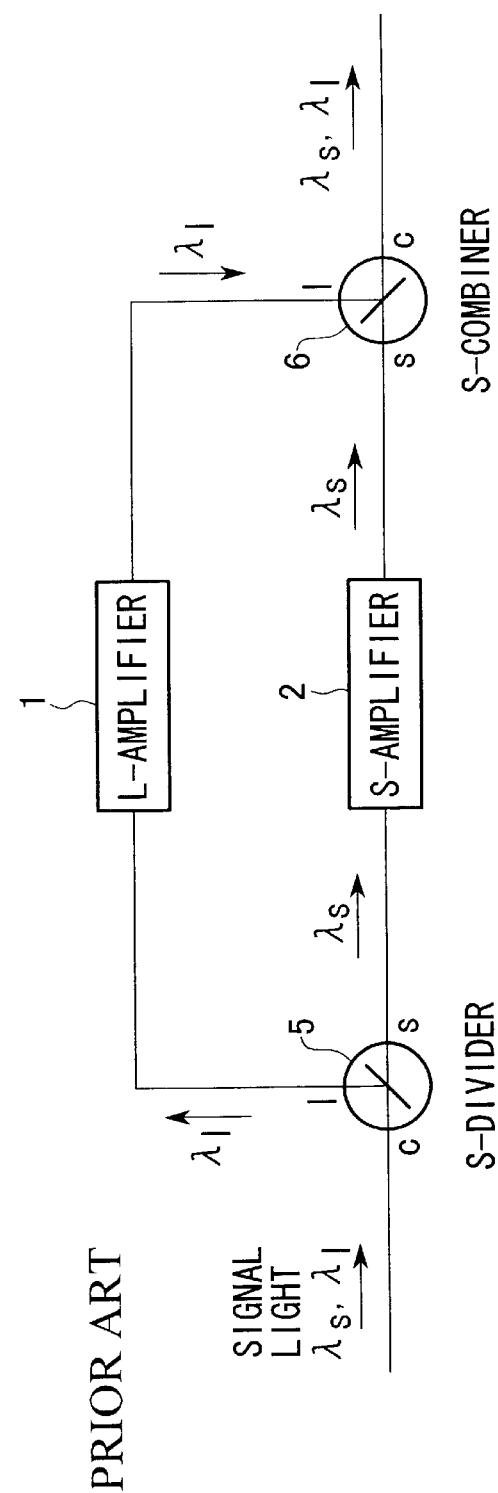
Figure 2A:
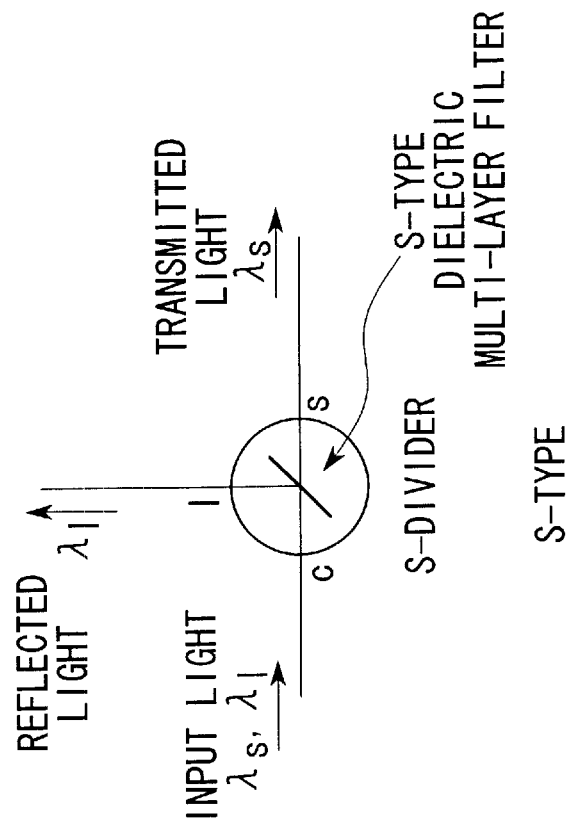
FIGS. 2A, 2B are schematic diagrams of conventional L-type and S-type dividers.
Figure 2B:
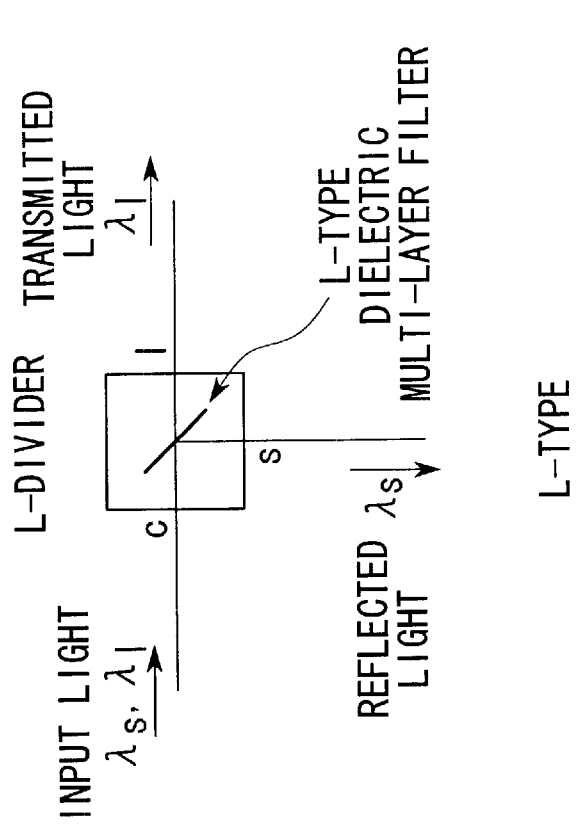
Figure 3B:
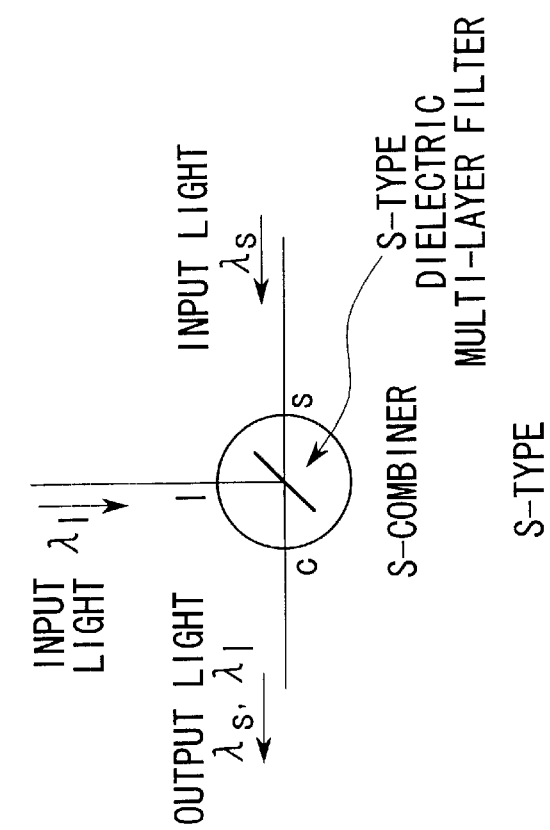
FIGS. 3A, 3B are schematic diagrams of conventional L-type and S-type combiners.
Figure 3A:
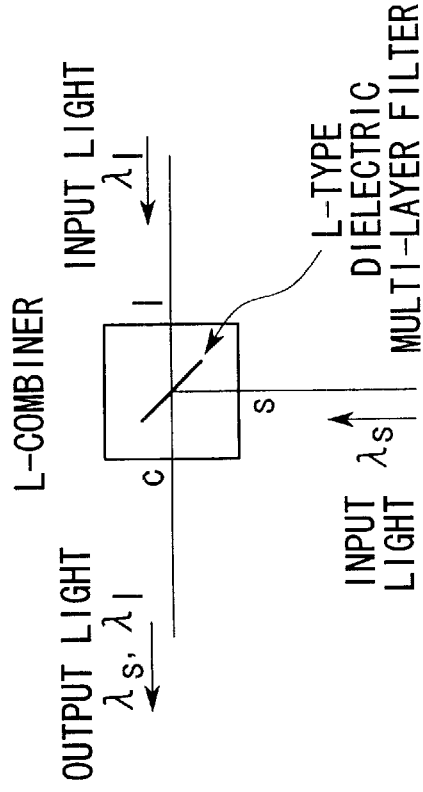
Figure 4A:
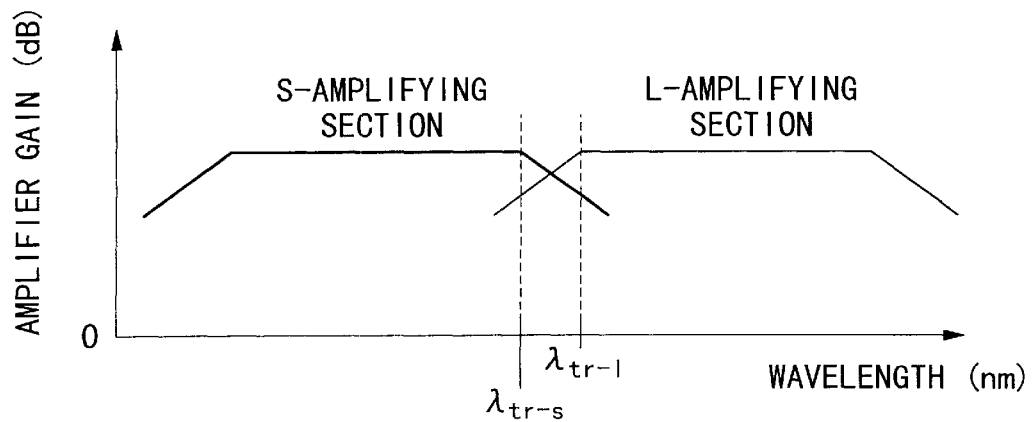
FIGS. 4A, 4B are graphs showing the gain spectra in the conventional amplifying section.
Figure 4B:
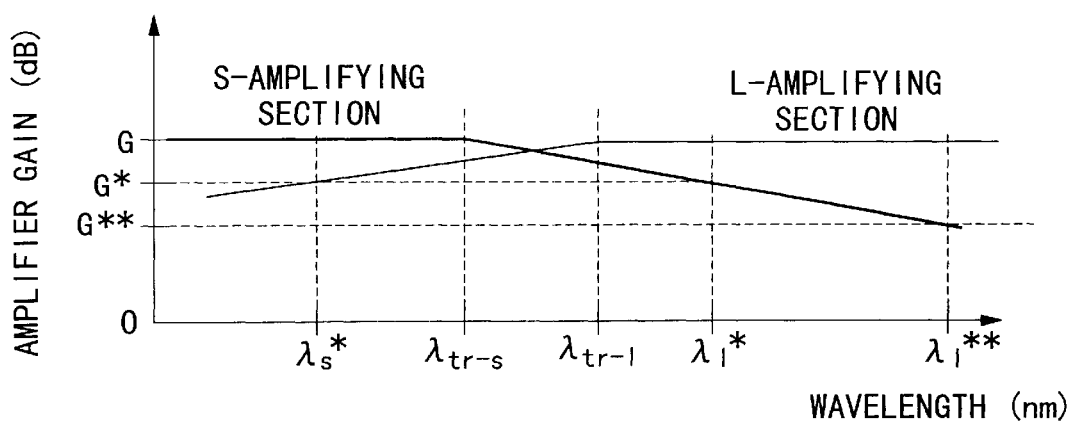
Figure 5A:
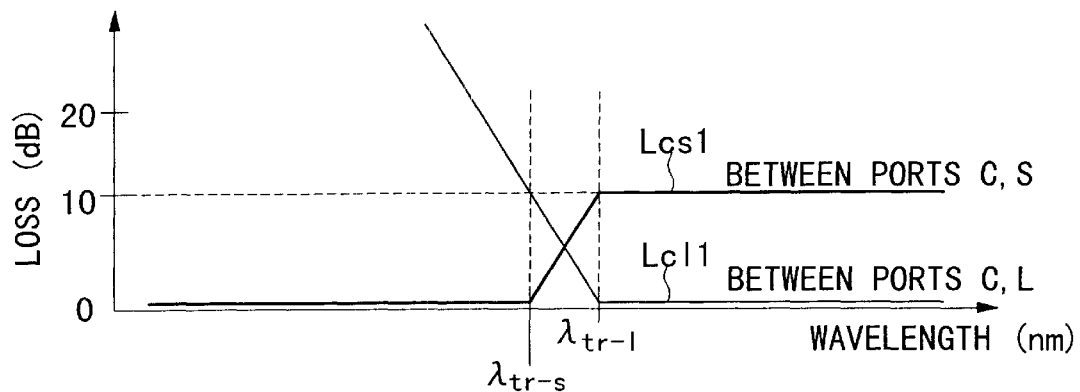
FIGS. 5A, 5B are graphs showing the loss spectra in a conventional L-type divider (and an L-type combiner).
Figure 5B:
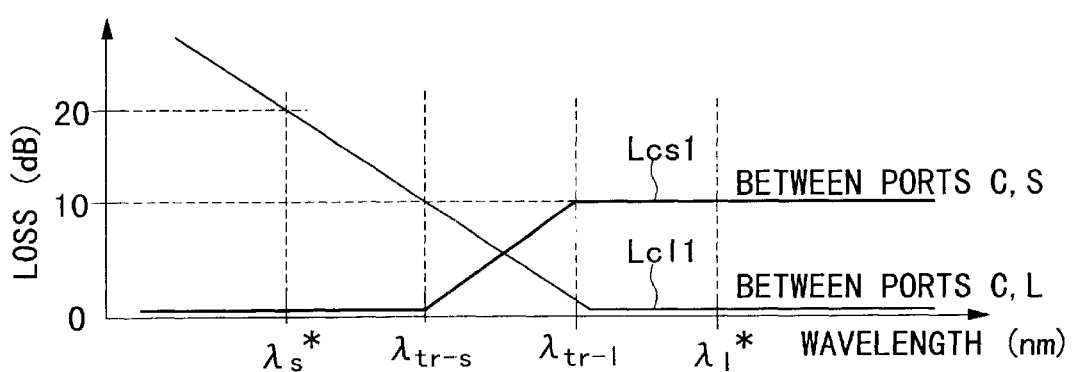
Figure 6A:
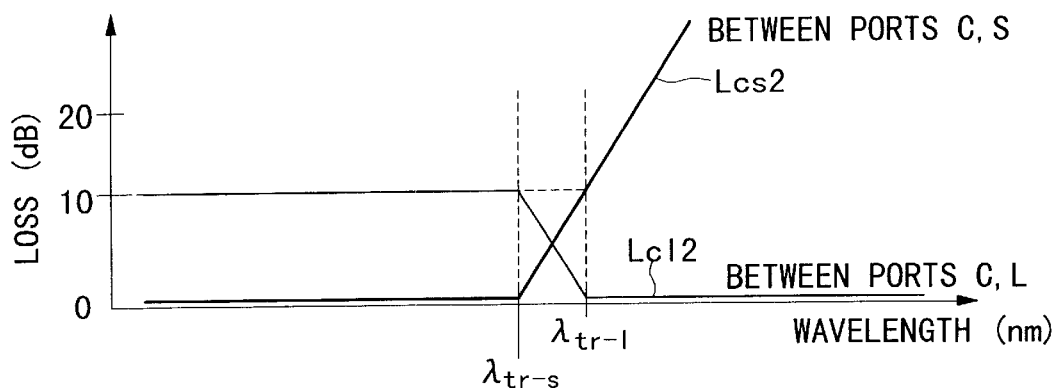
FIGS. 6A, 6B are graphs showing the loss spectra in a conventional S-type divider (and an S-type combiner).
Figure 6B:
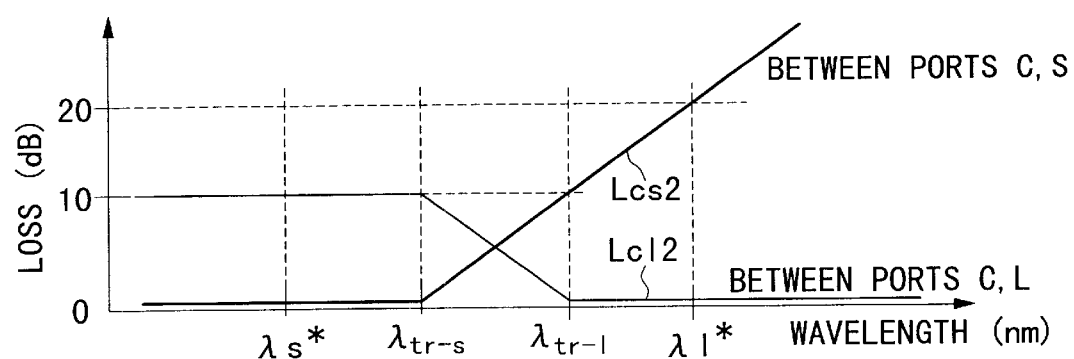
Figure 7A:
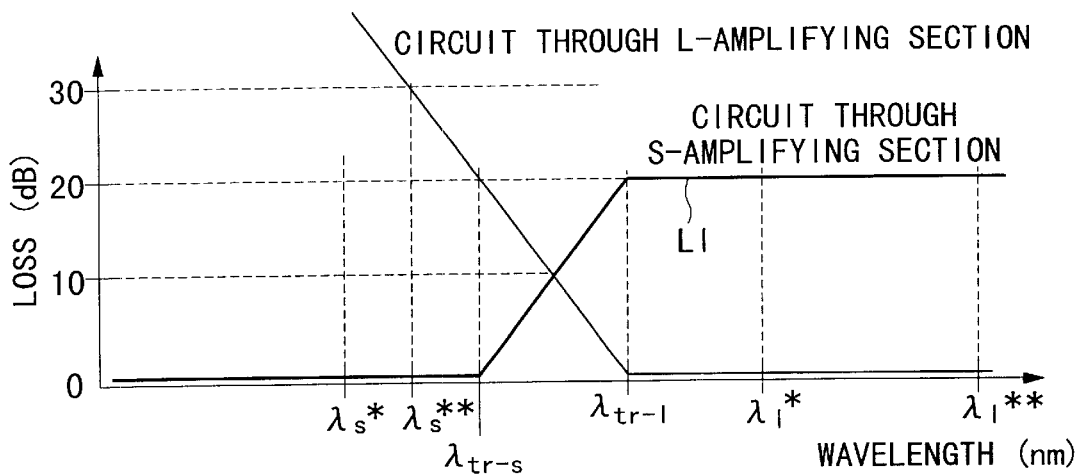
FIGS. 7A, 7B are graphs showing the circuit loss spectra in the conventional optical amplifier.
Figure 7B:
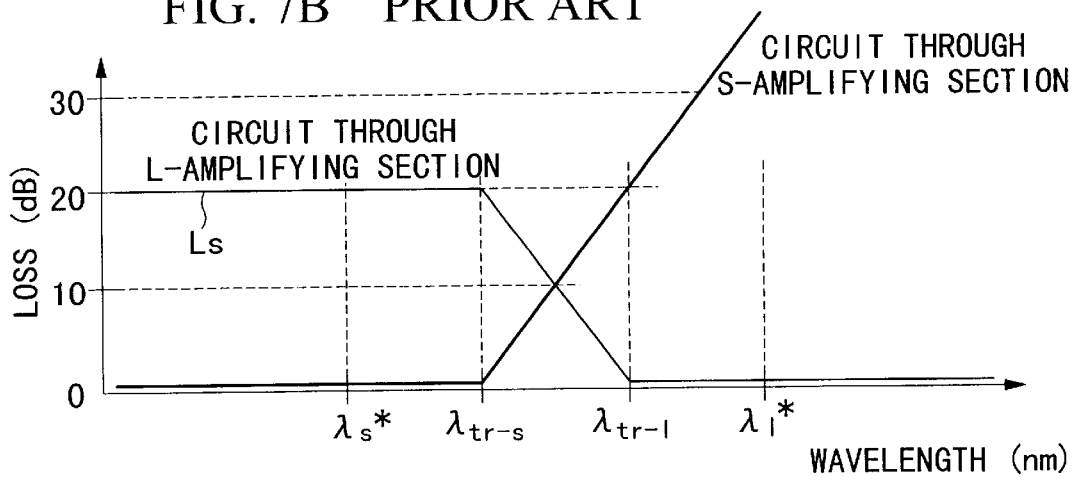
Figure 9:
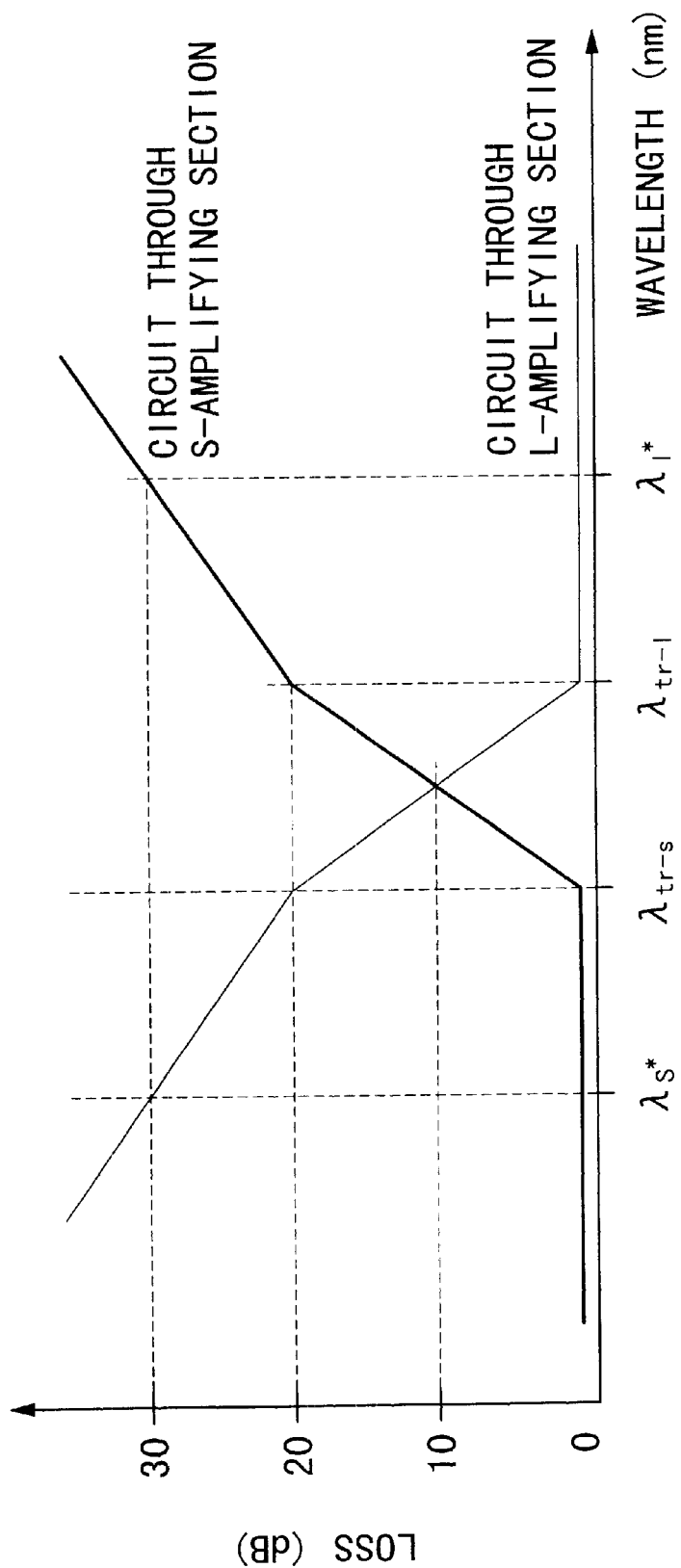
FIG. 9 is a graph showing the circuit loss spectrum in the first configuration.

The first configuration of the present optical amplifier is shown in FIGS. 8A and 8B. FIG. 8A shows a configuration based on an L-type divider and an S-type combiner (referred to as L-divider and S-combiner hereinafter), and FIG. 8B shows a configuration based on an S-divider and an L-combiner. FIG. 9 shows the circuit loss spectra of the amplifier in the first configuration, relating the circuit losses through the L- and S-amplifying sections, representing a sum of the losses in the divider and combiner in units of decibels (dB). This loss spectra are obtained from the loss spectra shown in FIGS. 5 and 6 which were explained in the section on the related art. The loss values are typical values as described in the section concerned with the related art.

The wavelength region that shows less than 30 dB power difference, P–P*, in FIG. 9 occurs from the vicinity of $\lambda s^*$ to the vicinity of $\lambda l^*$. This difference in the wavelengths (difference between the wavelengths in the vicinities of $\lambda s^*$ and $\lambda l^*$) is considerably smaller than the difference in the corresponding wavelengths (difference between the wavelengths in the vicinities of $\lambda s^{}$ and $\lambda l^{}$) described in the section concerned with the related art. That is, according to the first configuration, bandwidth of the signal waves affected by the interference noise is narrower compared with that of conventional amplifiers, because the residual reflection components have been reduced, thus enabling to expand the useable bandwidth of signal waves.

Figures 10A, 10B:
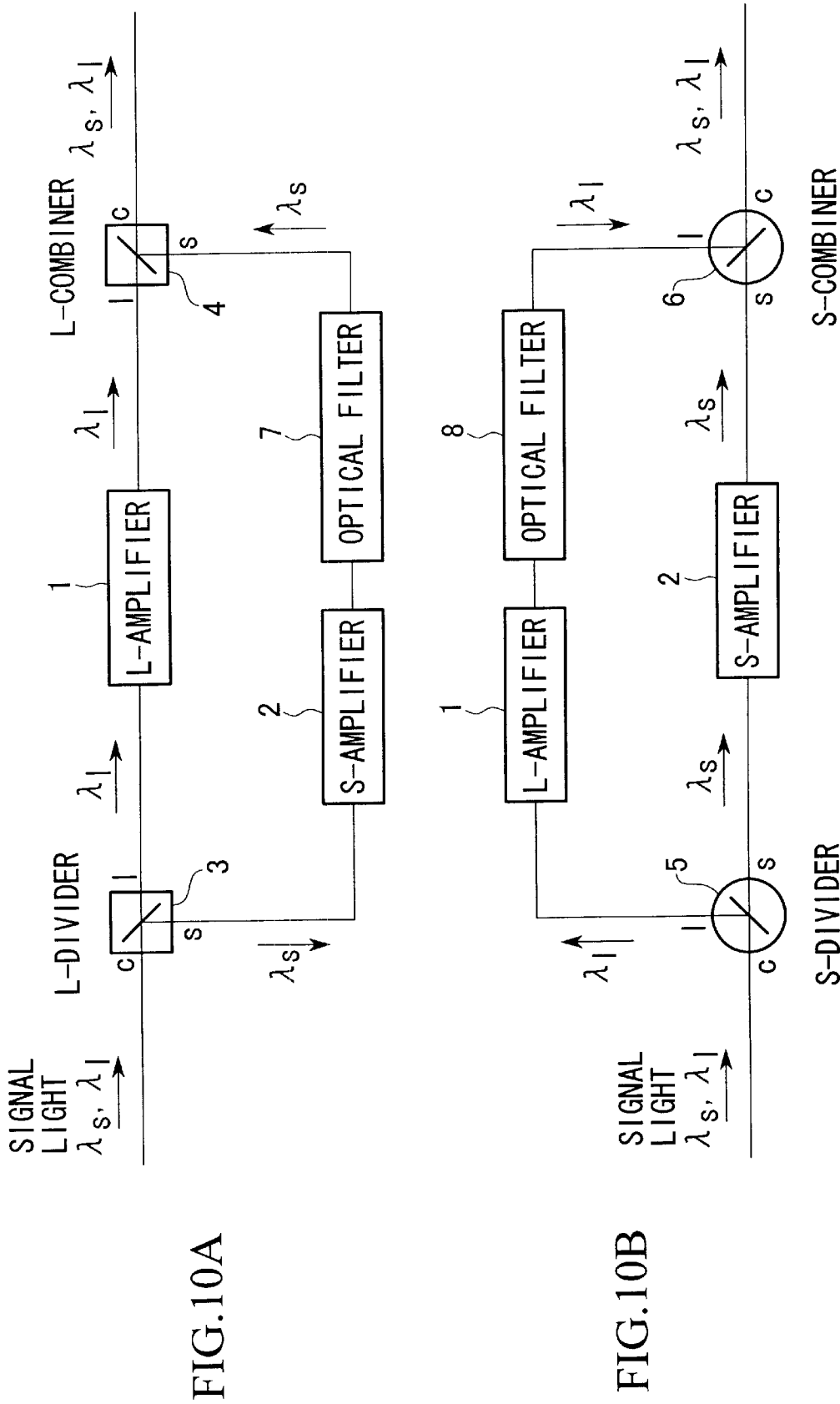
FIGS. 10A, 10B are schematic diagrams of the second configuration of the optical amplifier of the present invention.

The second configuration of the optical amplifier is shown in FIGS. 10A and 10B. FIG. 10A shows a configuration based on an L-divider and an L-combiner, and FIG. 10B shows a configuration based on an S-divider and an S-combiner.

According to the second configuration, an extra optical filter is added to the conventional technology. The optical filter 7 in FIG. 10A is a short wavelength transmission type and the optical filter 8 in FIG. 10B is a long wavelength transmission type. The filters 7 and 8 include 2-port optical filters having dielectric multi-layer filters or fiber gratings that reflect those signal waves having wavelengths in the vicinities of boundary wavelengths.

However, when optical amplifiers based on such filters 7 and 8, utilizing 2-port optical filter are made of dielectric multi-layer filters, amplifiers can be produced at lower cost compared with amplifiers based on other types of optical filters, because of the low cost of making dielectric multi-layer filters. When the filters 7 and 8 are made of fiber gratings, optical amplifiers utilizing such filters are advantageous because the insertion losses due to insertion of signal waves are smaller compared with the insertion losses experienced by other types of filters so that higher gain and output power as well as lower interference noise can be obtained from such optical amplifiers.

In FIGS. 10A and 10B, although the optical filters 7 and 8 are placed in the aft-stage of the L- and S-amplifying sections, they may be placed in series in the fore-stage. However, considering the insertion loss of the optical filters, the aft-stage placement is more advantageous than the fore-stage placement, because the interference noise is lower in such an arrangement.

Figure 11:
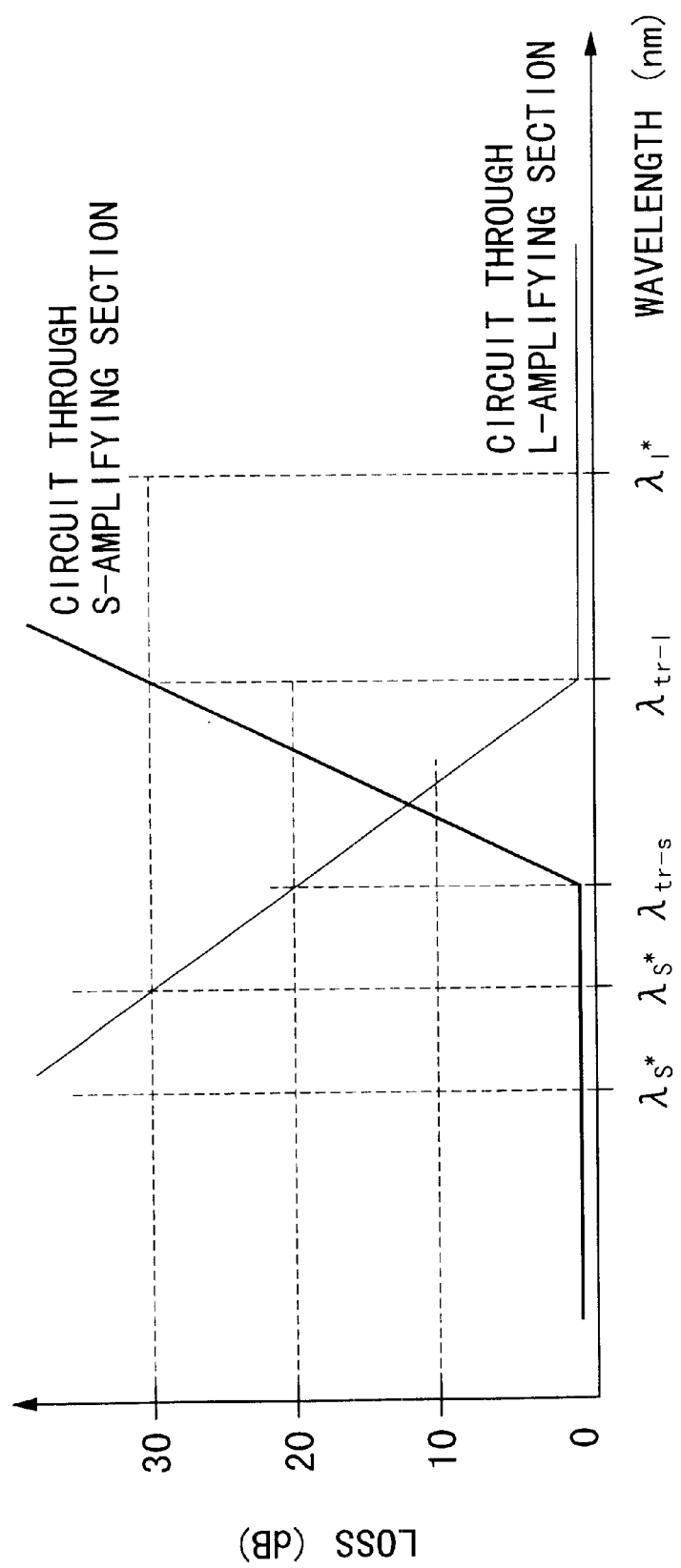
FIG. 11 is a graph showing a circuit loss spectrum in the second configuration of the optical amplifier of the present invention.

FIG. 11 shows a circuit loss spectrum of the optical amplifier based on the second configuration, especially the use of an L-divider and an L-combiner, shown in FIG. 10A. The optical filter 7 in this case is based on a 2-port optical filter having dielectric multi-layer filters, relating the circuit losses through the L- and S-amplifying sections, and representing a sum of the losses in the divider and combiner in units of decibels (dB). These loss spectra are obtained from the loss spectra shown in FIGS. 5 and 6 relating to the section on the related art. The loss values are typical values as described in the section concerned with the related art.

The wavelength region that shows less than 30 dB power difference, P–P*, in FIG. 11 occurs from the vicinity of $\lambda s^{}$ to the vicinity of $\lambda tr$-l. This difference in the wavelengths (difference between the wavelengths in the vicinities of $\lambda s^{}$ and $\lambda tr$-l) is considerably small than the difference in the corresponding wavelengths described in the section concerned with the related art. That is, according to the second configuration, bandwidth of the signal waves affected by the interference noise is narrower compared with that of conventional amplifiers, thus enabling to expand the bandwidth of useable signal wavelengths.

The foregoing embodiments were all based on dielectric multi-layer filters, but the following optical amplifiers are based on other types of filters.

Figure 23:
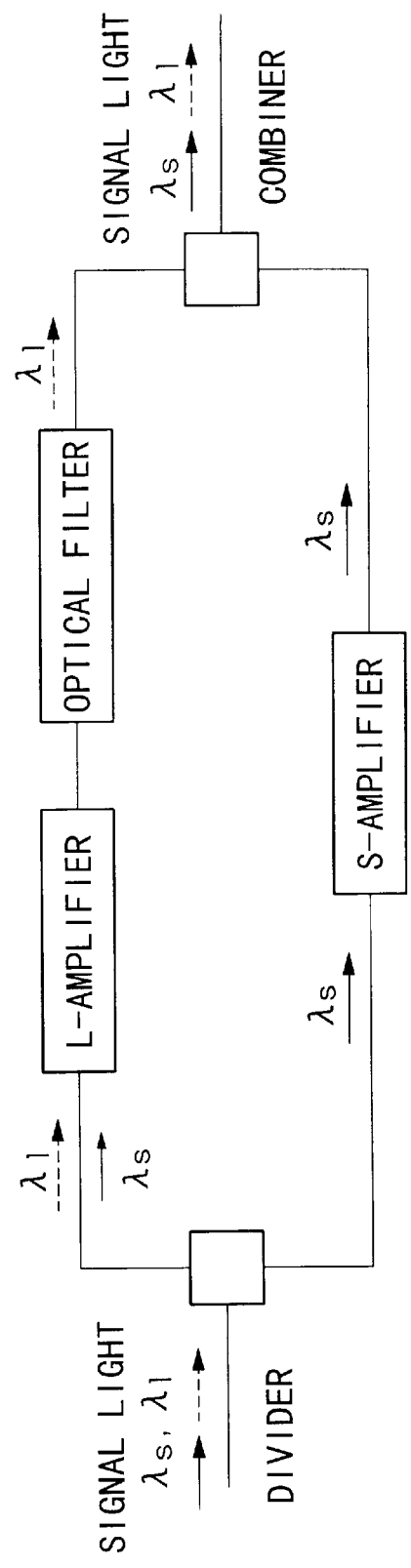
FIG. 23 is a schematic diagram of the third configuration of the optical amplifier of the present invention.

FIG. 23 shows a third configuration of the optical amplifier. The divider (1:1 division) and combiner are either fiber couplers (combiners), whose performance properties do not vary with wavelengths, or a combination of a fiber coupler and either a divider or a combiner made of dielectric multi-layer filters.

Because the signal wavelength $\lambda s$ in the short wavelength band is close to the wavelengths in the wave boundary between the long and short wavelength bands, such signal waves tend to mix with the long wavelengths in the long wavelength L-amplifying section, and therefore, such mixed wave components are eliminated by placing an optical filter in the aft-stage of the L-amplifying section. The loss value in the optical filter for the mixed waves should be higher than 30 dB for the same reasons as explained earlier.

Although a combination of a circulator and a fiber grating (as a divider or a combiner) is used in References 5 and 6, the fiber grating clearly serves a different purpose than the optical filter provided in the present invention as a constituting element for the purpose of eliminating residual reflection components.

In the three configurations presented above (first to third configurations), there are two amplifying sections, however, when there are three amplifying sections, it is clear that the same configuration and results can be derived by re-configuring the amplifying circuit in such a way that two adjacent long wavelength bands are grouped to be processed in one amplifying section using a pair of divider and combiner, as explained above, so that the operation is the same as the amplifier having two amplifying sections. Even if the number of amplifiers exceeds four, other alternative arrangements may similarly be provided. Therefore, the present invention is valid in any amplifier having more than two amplifying sections.

In the following, various embodiments of the optical amplifier based on the present configuration designs will be explained with reference to the drawings.

Embodiment 1

Figure 12:
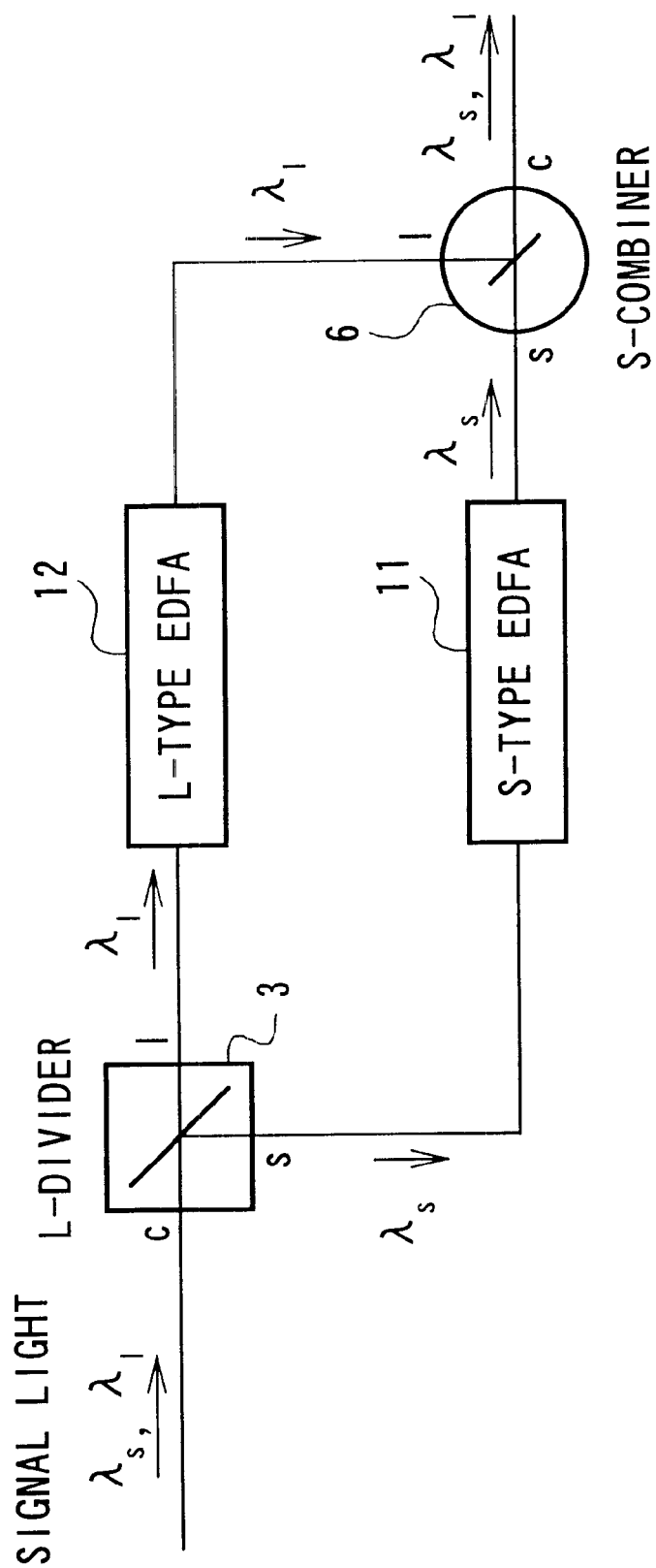
FIG. 12 is a schematic diagram of the configuration of Embodiment 1 of the optical amplifier of the present invention.

FIG. 12 shows an optical amplifier in Embodiment 1. This is an example of using an erbium doped fiber amplifier (EDFA) in the amplifying section. A regular EDFA for short wavelength band (S-type EDFA) 11 is used for processing short wavelength signals, and a long wavelength band (L-type EDFA) 12, having the bandwidth enlarged by a gain equalizer, described in the section concerned with the related art, was used for processing long wavelength signals.

Figure 13A:
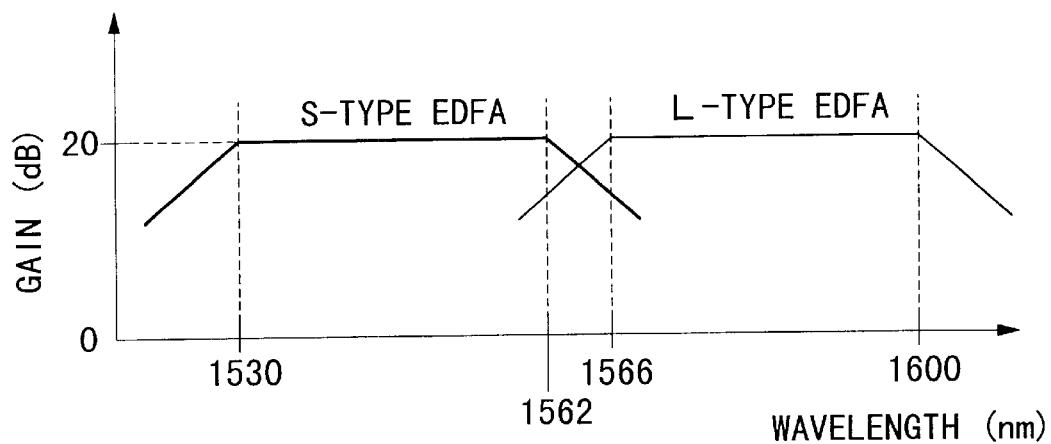
FIGS. 13A, 13B are graphs showing the gain spectra of the optical amplifier in the first embodiment.
Figure 13B:
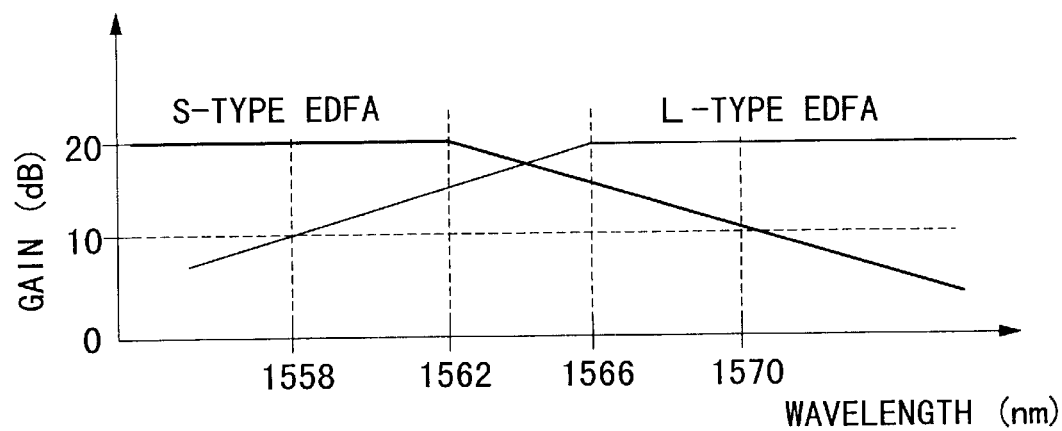
Figure 14:
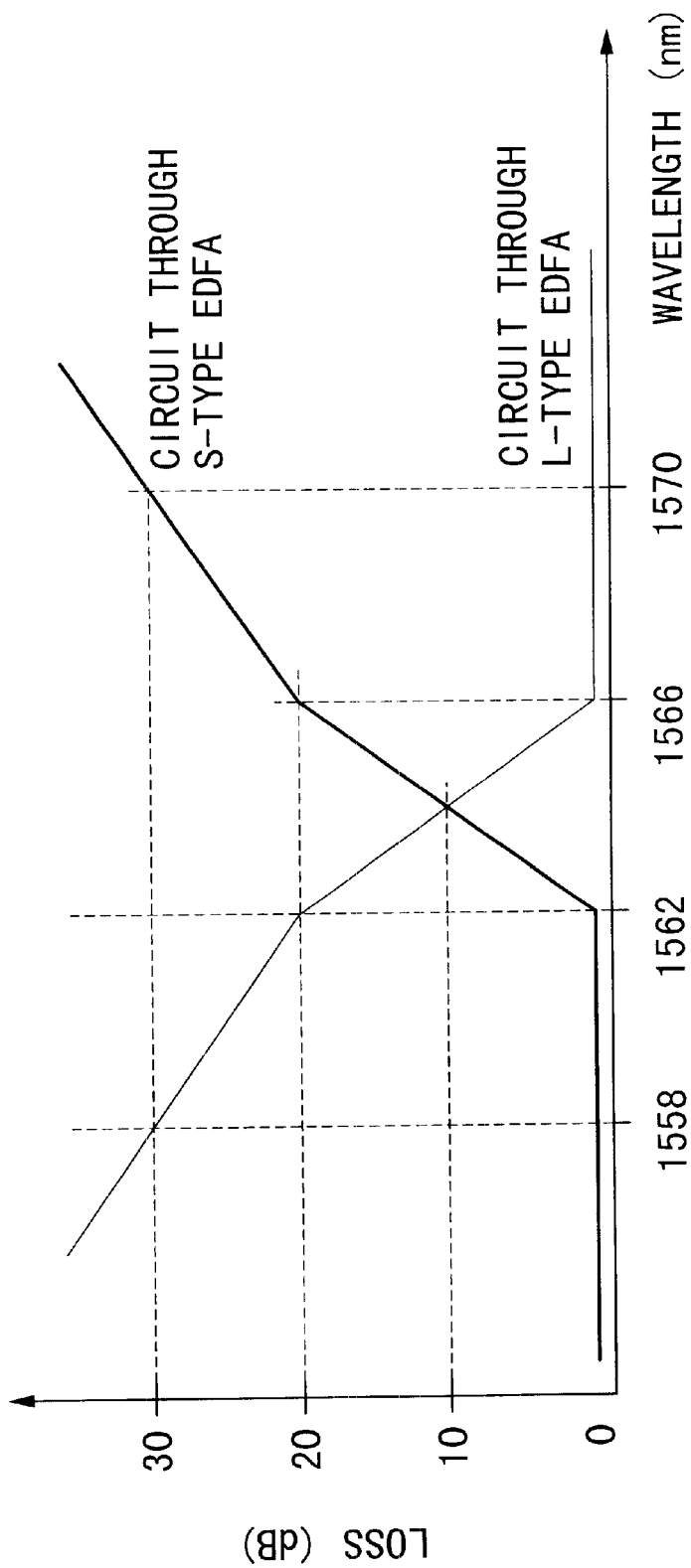
FIG. 14 is a graph showing the circuit loss spectrum in Embodiment 1.

FIGS. 13A and 13B show schematic diagrams of the gain spectra of the amplifying sections (S-type EDFA and L-type EDFA) in Embodiment 1, where FIG. 13A relates to the overall view of the spectrum and FIG. 13B relates to the details of the spectrum near the wave boundary. The wave boundary extends from 1562 to 1566 nm. The number of layers of the dielectric multi-layer filter is approximately 100. The peak gain of the amplifying section is 20 dB, and the gains for S-type EDFA and L-type EDFA at 1570 nm are 10 dB for each. FIG. 14 shows the circuit loss spectrum of the amplifier in Embodiment 1.

The boundary bandwidth in which the differential power P–P* of the signal waves is less than 30 dB is approximately 1560~1568 nm according to the results shown in FIGS. 13, 14. It means that the bandwidth of the "latent noise region" is 8 nm. On the other hand, in the conventional optical amplifiers based on L-type divider and S-type combiner, the corresponding boundary bandwidth is approximately 1561~1574, resulting in the bandwidth of the latent noise region of 13 nm.

As explained above, compared with the conventional technologies, the bandwidth of the latent noise region (wavelength region that cannot be used for signal waves because of interference noise effects) in the present optical amplifier is about a half of the conventional width ($8/13$ to be exact).

Embodiment 2

Figure 15:
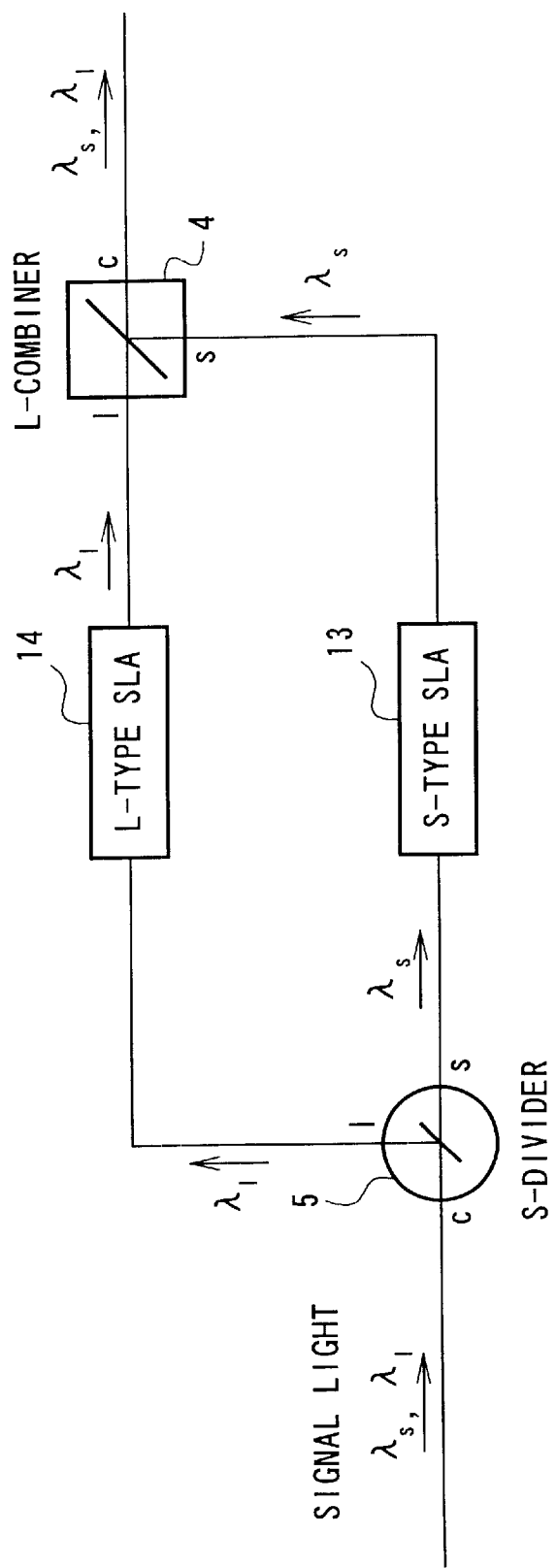
FIG. 15 is a schematic diagram of the configuration of the optical amplifier in Embodiment 2 of the present invention.

FIG. 15 shows a configuration of the optical amplifier in Embodiment 2. This is an example of using a semiconductor laser amplifier (SLA) in the amplifying section. The wavelength gain region of SLA can be changed by varying the semiconductor composition ratio. In this embodiment, although short wavelength band SLA (S-type SLA) 13 and long wavelength band SLA (L-type SLA) 14 are being used, and they have primarily different composition ratios of semiconductors.

Figure 16A:
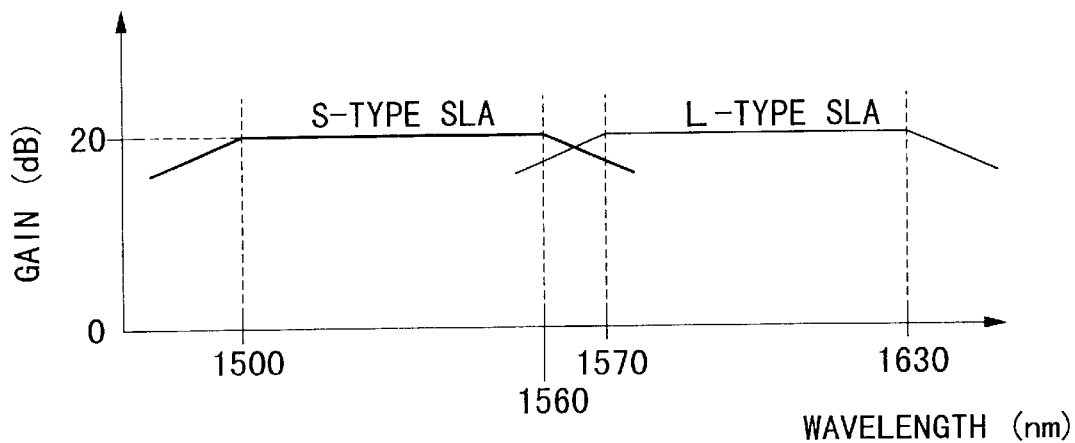
FIGS. 16A, 16B are graphs showing the gain spectra in the amplifying section in Embodiment 2.
Figure 16B:
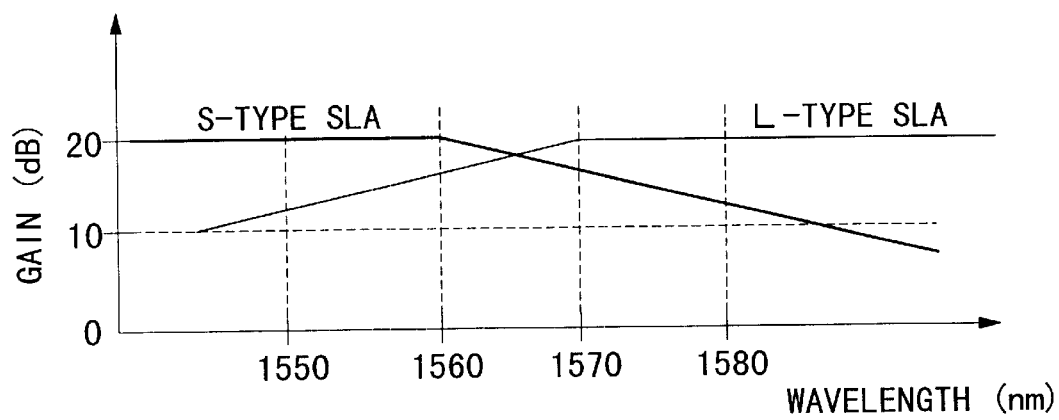
Figure 17:
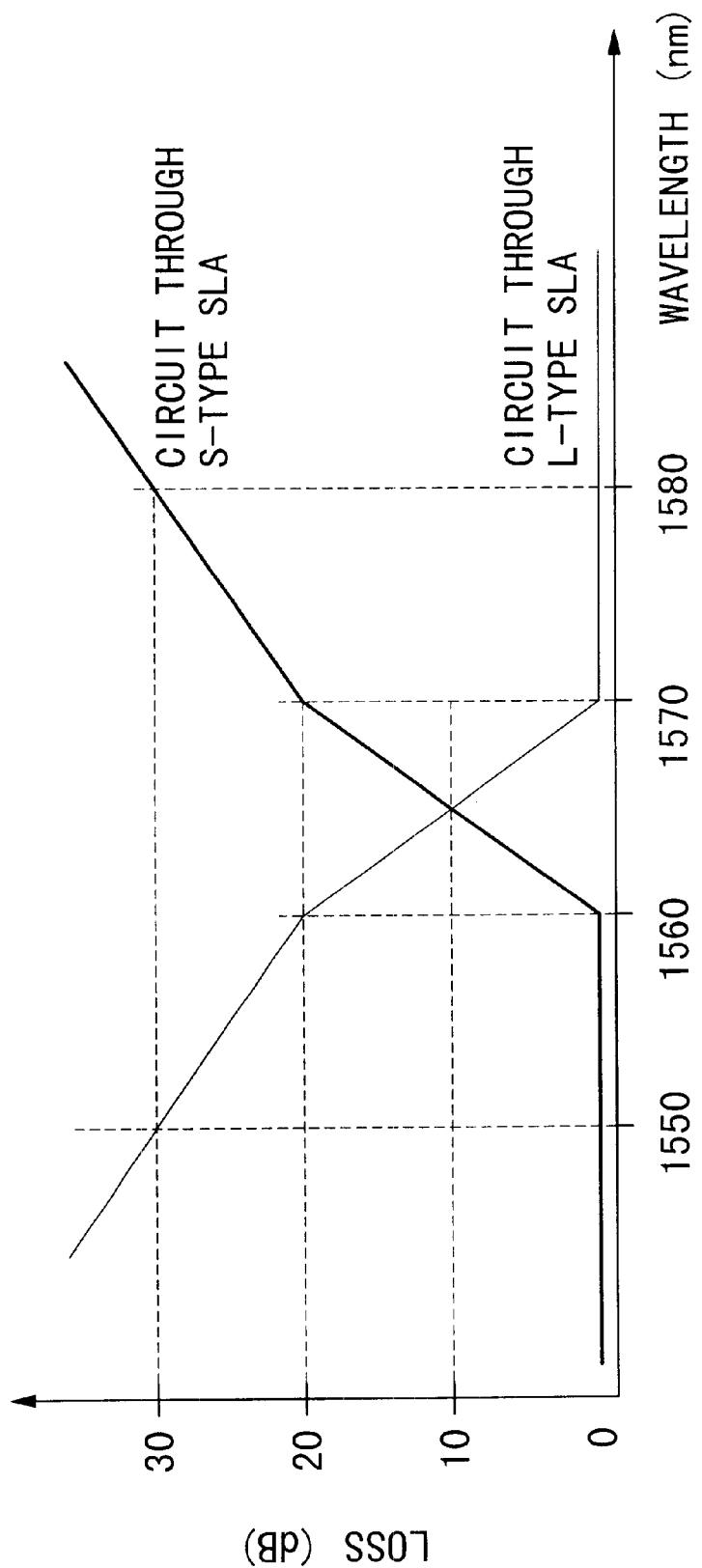
FIG. 17 is a graph showing the circuit loss in Embodiment 2.

FIGS. 16A and 16B show schematic diagrams of the gain spectra of the amplifying sections (S-type and L-type SLA) in this embodiment, where FIG. 16A relates to the overall spectrum and FIG. 16B relates to the spectrum near the wave boundary. The wave boundary extends from 1560 to 1570 nm. The number of layers of the dielectric multi-layer filter is approximately 50. The peak gain of the amplifying section is 20 dB, and the gains for S-type SLA 13 and L-type SLA 14 at 1585 nm are 10 dB for each. FIG. 17 shows the circuit loss spectrum of the amplifier in this embodiment.

The boundary bandwidth in which the differential power P–P* of the signal waves is less than 30 dB is approximately 1554~1576 nm according to the results shown in FIGS. 16, 17. It means that the width of the latent noise region is 22 nm. On the other hand, in the conventional optical amplifiers based on L-divider and S-combiner, the corresponding boundary bandwidth is approximately 1557~1595, resulting in the width of the latent noise region of 38 nm.

As explained above, compared with the conventional technology, the width of the latent noise region (wavelength region that cannot be used for signal waves because of interference noise effects) in the present optical amplifier is about a half of the conventional width ($22/38$ to be exact).

Embodiment 3

Figure 18:
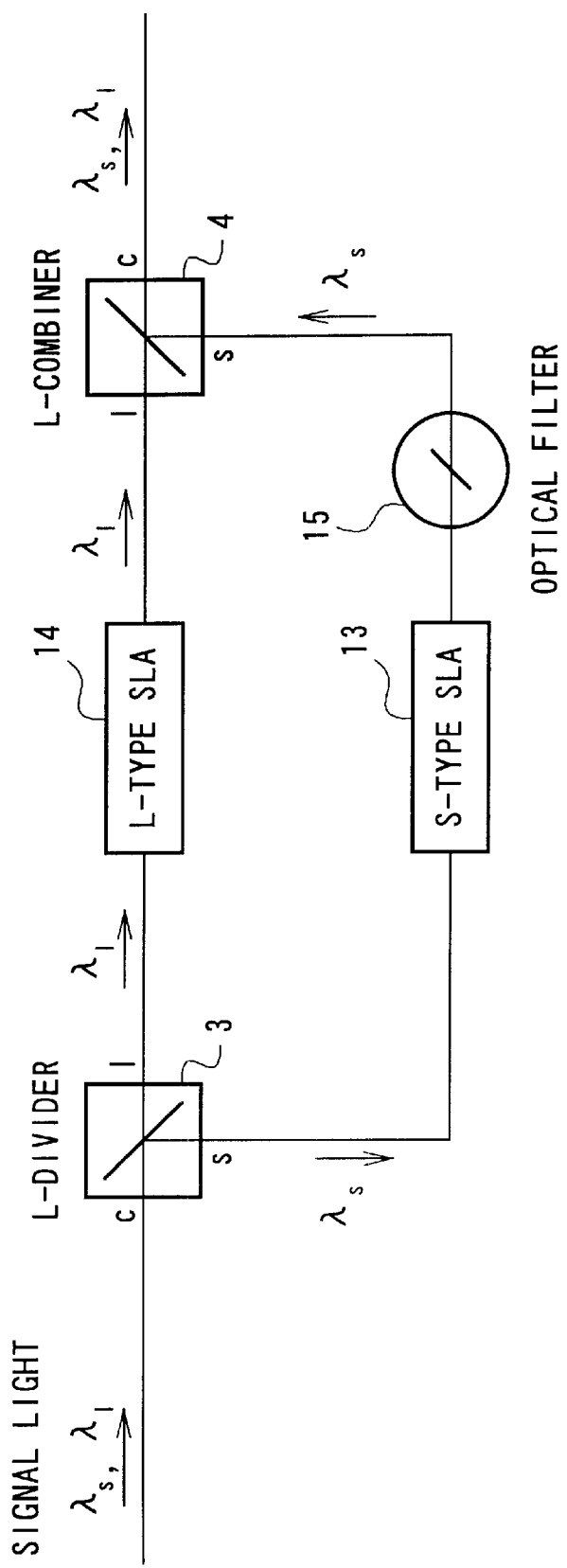
FIG. 18 is a schematic diagram of the configuration of the optical amplifier in Embodiment 3.

FIG. 18 shows a configuration of the optical amplifier in Embodiment 3. This is an example of using a semiconductor laser amplifier (SLA) and an optical filter in the amplifying section. The wavelength gain region of SLA can be changed by varying the semiconductor composition ratio. In this embodiment, although short wavelength band SLA (S-type SLA) 13 and long wavelength band SLA (L-type SLA) 14 are being used, they are primarily different in the semiconductor composition ratios.

Figure 19:
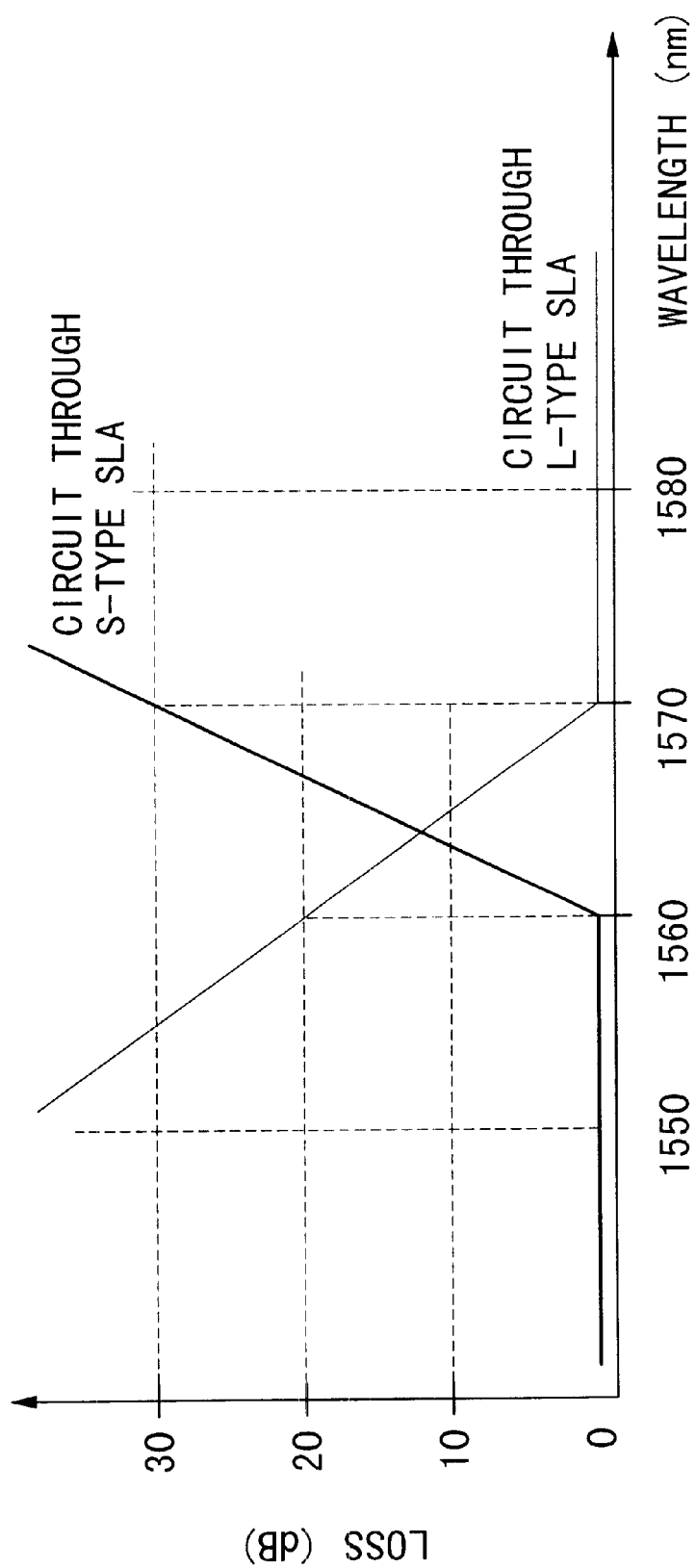
FIG. 19 is a graph showing the circuit loss spectrum in Embodiment 3.

The structure of the amplifying section in this embodiment is the same as that in FIGS. 16A and 16B. The number of layers in the dielectric multi-layer filter, L-divider, L-combiner and the optical filter 15 used in the amplifier shown in FIG. 18 is approximately 50. FIG. 19 shows circuit loss spectrum for the amplifier in this embodiment.

The boundary bandwidth in which the differential power P–P* of the signal waves is less than 30 dB is approximately 1556~1570 nm according to the results shown in FIGS. 16, 19. It means that the bandwidth of the latent noise region is 14 nm. On the other hand, in the conventional optical amplifiers based on L-divider and L-combiner, the corresponding boundary bandwidth is approximately 1557~1595, giving the width of the latent noise region as 38 nm.

As explained above, compared with the conventional technology, the width of the latent noise region (wavelength region that cannot be used for signal waves because of interference noise effects) in the present optical amplifier is about a third of the conventional width ($14/38$ to be exact).

Embodiment 4

Figure 20:
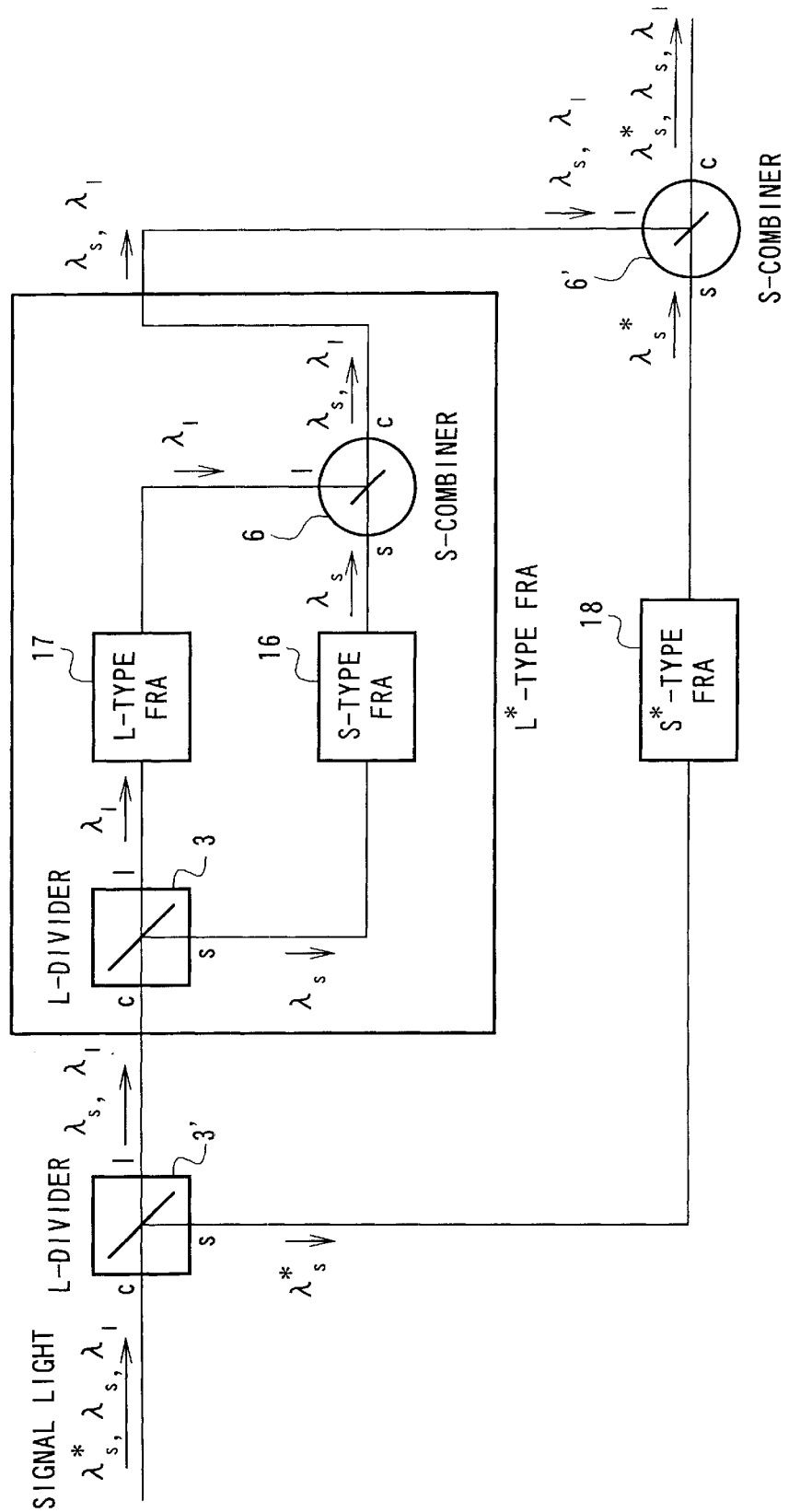
FIG. 20 a schematic diagram of the configuration of the optical amplifier in Embodiment 4.
Figure 21:
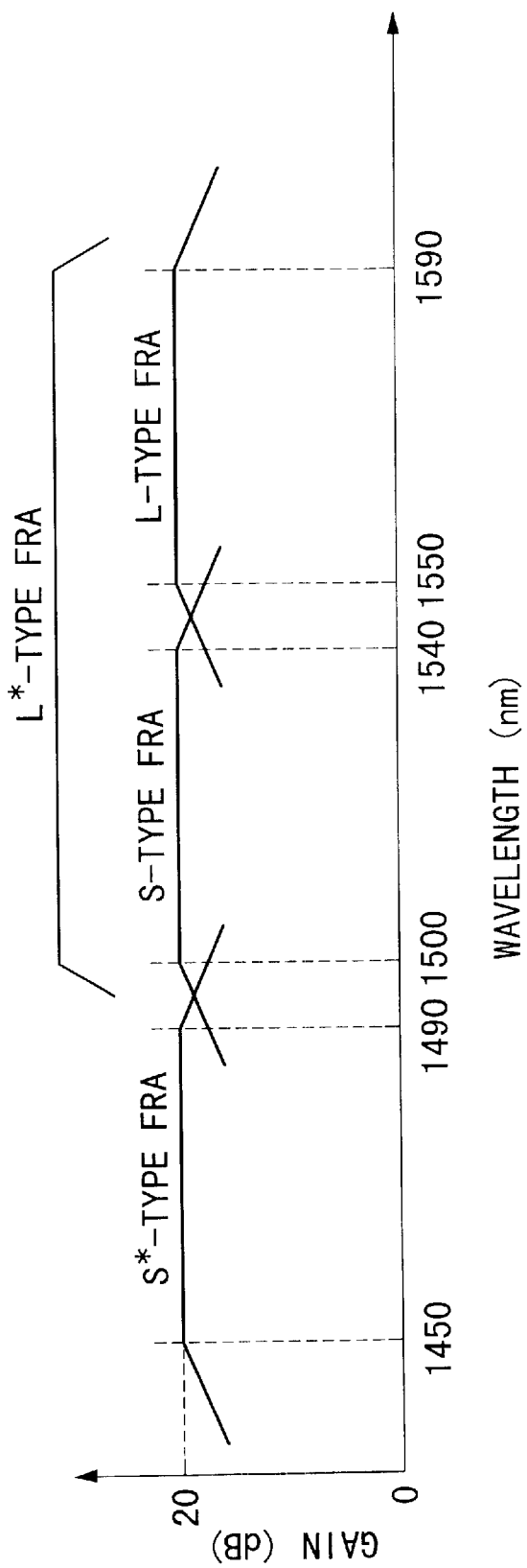
FIG. 21 is a graph showing the circuit loss spectrum in Embodiment 4.
Figure 22:
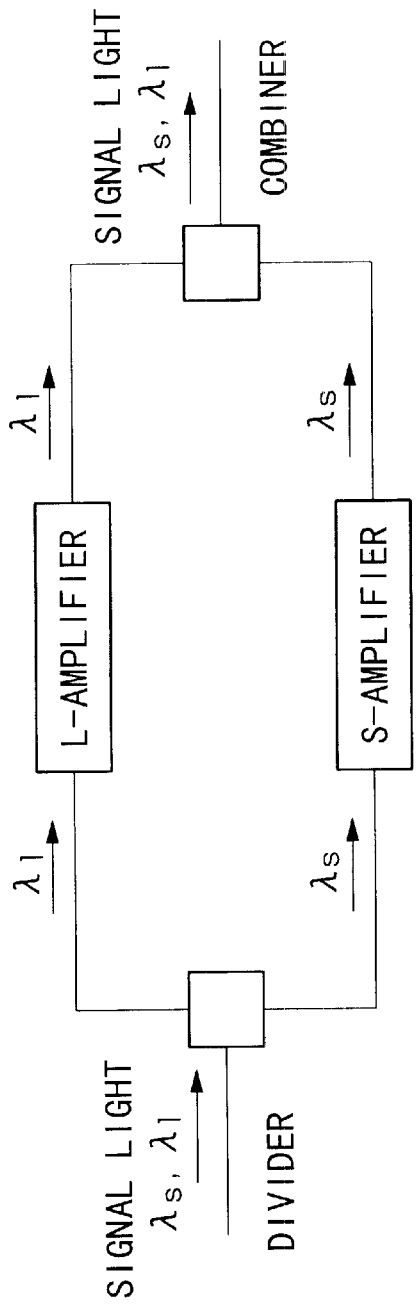
FIG. 22 is a schematic diagram of the basic configuration of the conventional optical amplifier.

FIG. 20 shows a configuration of the optical amplifier in Embodiment 4. This is an example of using a fiber Raman amplifier (FRA) in the amplifying section. The wavelength gain region of FRA can be changed by varying the pumping wavelength. The amplifier in this embodiment is a 3-wavelength band amplifier, based on the concept outlined earlier to regard an amplifier for two wavelength bands as one amplifying section. A short wavelength band FRA (S-type FRA) 16 and a long wavelength band FRA (L-type FRA) 17 are used to construct a 2-wavelength band optical amplifier, which is designated as the new long wavelength band FRA (L*-type FRA), and a short wavelength band FRA (S*-type FRA) 18 is used at the short wavelength end of the new L*-type FRA, as a third amplifying section, in association with an L-divider (3') and an S-combiner (6'). The outlines of the gain spectra of the amplifying sections (S-type FRA, L-type FRA, and S*-type FRA) are shown in FIG. 21.

The number of layers of the dielectric multi-layer filters used in the L-divider and S-combiner used in this embodiment is approximately 50. Similar to Embodiment 3, the width of the latent noise region relates, in this case, to the widths of the two wave boundaries in the 3-wavelength bands, and both are 14 nm. On the other hand, in the conventional optical amplifier, the corresponding boundary bandwidth is 38 nm.

As explained above, compared with the conventional technology, the width of the latent noise region (wavelength region that cannot be used for signal waves because of interference noise effects) in the present optical amplifier is about a third of the conventional width ($14/38$ to be exact).

Embodiment 5

Figure 24:
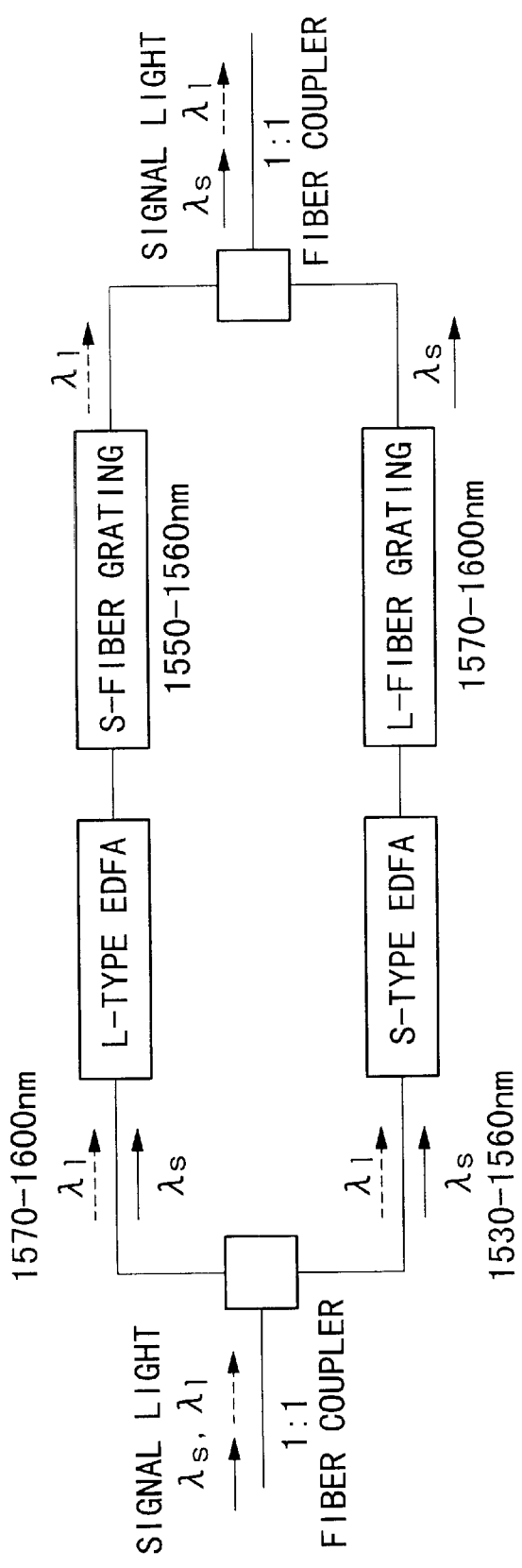
FIG. 24 is a schematic diagram of the configuration of the optical amplifier in Embodiment 5 of the present invention.

FIG. 24 shows a configuration of the optical amplifier in Embodiment 5. This configuration appears similar to the one for Embodiment 1, but Embodiment 1 is based on the first amplifier configuration, and Embodiment 5 is based on the third amplifier configuration of the present invention. The amplifying section is comprised by an S-type EDFA for short wavelengths, an L-type EDFA for long wavelengths, and the divider and combiner are made of fiber couplers that are not dependent on wavelength and having a 1:1 split ratio. A fiber grating is placed in each aft-stages of the S-EDFA and L-EDFA for eliminating long wavelength signal waves and short wavelength signal waves, respectively, to serve as optical filters, and are respectively referred to as L-fiber-grating and S-fiber-grating. The S- and L-EDFA respectively amplify signal waves having wavelengths in a range of 1530~1560 nm and wavelengths in a range of 1570~1600 nm.

The S-fiber-grating filters only those signal waves having wavelengths in a range of 1550~1560 nm to generate a loss value of more than 20 dB. However, the L-EDFA generates a gain of more than 20 dB for wavelengths of signal waves in a range of 1570~1600 nm, at the same time, a gain of less than 10 dB for wavelengths of signal waves in a range of 1550~1560 nm, and a loss of more than 10 dB for wavelengths of signal waves in a range of 1530~1550 nm. Also, the L-fiber-grating filters only those waves having wavelengths in a range of 1570~1600 nm to generate a loss value of more than 20 dB. However, the S-EDFA generates a gain of more than 20 dB for wavelengths of signal waves in a range of 1530~1560 nm, at the same time, a gain of less than 10 dB for wavelengths of signal waves in a range of 1570~1600 nm. Fiber gratings having such optical properties can be produced readily at low cost.

In this embodiment, non-useable wavelength range for signal waves is 10 nm that exists between 1560~1570 nm. This value is less than half the value generally observed in the conventional technologies and is clearly less than the conventional amplifiers that do not use L- and S-fiber-gratings.

Also, in this embodiment, because the divider and combiner used in the input section and output section of the amplifier have a split ratio of 1:1 and no wavelength dependency, compared with an amplifier based on wave-separation type divider and combiner such as dielectric multi-layer filters, an excess loss value of nearly 3 dB is generated. However, fiber couplers having a 1:1 split ratio and no wavelength dependency have an advantage that they generally cost less than other types of filters. Also, the excess loss can be compensated by providing additional means.

Embodiment 6

Figure 25:
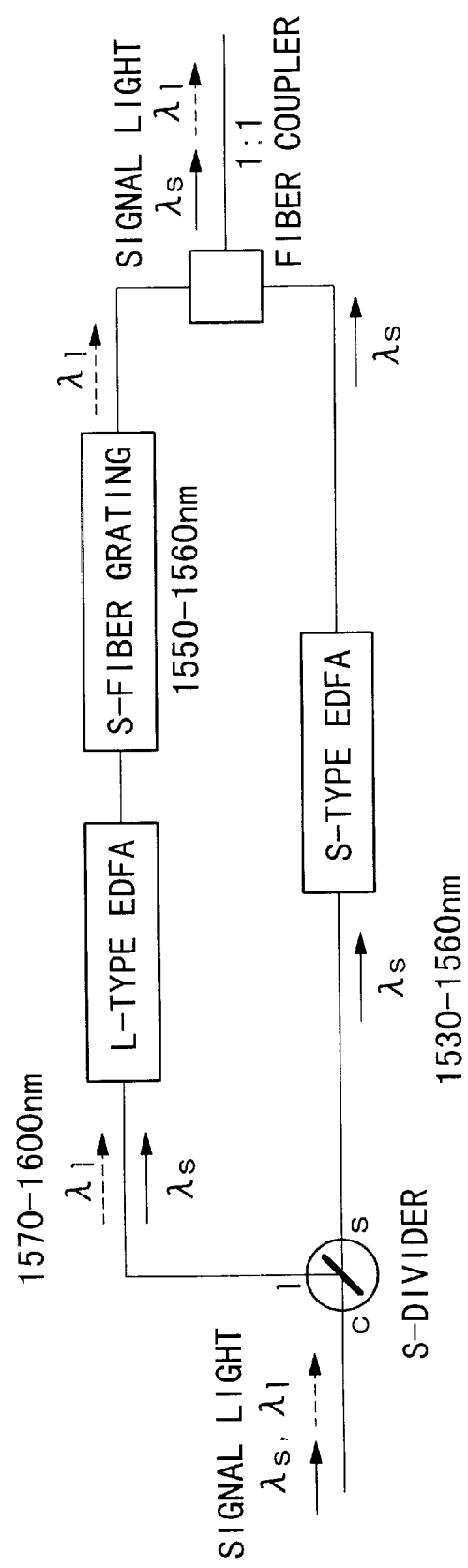
FIG. 25 is a schematic diagram of the configuration of the optical amplifier in Embodiment 6 of the present invention.

FIG. 25 shows a configuration of the optical amplifier in Embodiment 6. This configuration may appear similar to the one for Embodiment 1, but a significant difference is that the divider is based on a dielectric multi-layer filter and the combiner is based on a fiber coupler having a 1:1 split ratio and no wavelength dependency. Also, an S-fiber-grating is placed in the aft-stage of the L-EDFA as an optical filter for filtering signal waves in the short wavelength band.

The S-fiber-grating filters only those signal waves having wavelengths in a range of 1550~1560 nm to generate a loss value of more than 10 dB. However, the L-EDFA generates a gain of 20 dB for wavelengths of signal waves in a range of 1570~1600 nm, at the same time, a gain of less than 10 dB for wavelengths of signal waves in a range of 1550~1560 nm, and a loss of more than 10 dB for wavelengths of signal waves in a range of 1530~1550 nm. Also, the S-divider generates a loss of more than 10 dB for signal waves in a range of 1530~1560 nm between input port (c) and port (l) connecting to the L-EDFA.

In this embodiment, the latent noise bandwidth is 10 nm that exists between 1560~1570 nm. This value is clearly less than the conventional amplifiers that do not use S-fiber-gratings, and is less than half the value generally observed in the conventional technologies.

The present invention has been demonstrated using examples as described above, but the configurations of the amplifiers are not limited to those demonstrated in specific examples, and includes those circuit designs within the concept outlined in the present invention.

What is claimed is:

1. An optical amplifier comprising:
    an optical divider having a dielectric multi-layer filter for dividing input signal light according to wavelength:
        two amplifying sections disposed in parallel and having different wavelength amplification regions for amplifying respective light signals emitted from said optical divider; and
        an optical combiner for combining light signals output from respective amplifying sections using a filter having a blocking wavelength region different than that of said dielectric multi-layer filter provided in said optical divider.

2. An optical amplifier according to claim 1 wherein said optical divider uses a long wavelength transmission type dielectric multi-layer filter, and said optical combiner uses a short wavelength transmission type dielectric multi-layer filter.

3. An optical amplifier according to claim 1 wherein said optical divider uses a short wavelength transmission type dielectric multi-layer filter, and said optical combiner uses a long wavelength transmission type dielectric multi-layer filter.

4. An optical amplifier having parallel amplifying sections, wherein said amplifier according to claim 1 disposed in one of the amplifying sections.

* * * * *